United States Patent [19]
Rudish et al.

[11] Patent Number: 5,793,798
[45] Date of Patent: Aug. 11, 1998

[54] VIRTUAL BEAM SYSTEM

[75] Inventors: Ronald Rudish, Commack; Joseph Levy, Merrick, both of N.Y.

[73] Assignee: AIL Systems, Inc., Deer Park, N.Y.

[21] Appl. No.: 573,946

[22] Filed: Dec. 18, 1995

[51] Int. Cl.$^6$ .................. H04B 1/707; H04B 1/713
[52] U.S. Cl. .................. 375/206; 375/203; 375/208
[58] Field of Search ............ 375/202, 206–210, 375/260, 367

[56] References Cited

U.S. PATENT DOCUMENTS

| | | | |
|---|---|---|---|
| 5,228,055 | 7/1993 | Uchida et al. | 375/208 |
| 5,243,629 | 9/1993 | Wie | 375/260 X |
| 5,274,836 | 12/1993 | Lux | 375/260 X |
| 5,548,613 | 8/1996 | Kaku et al. | 375/208 |
| 5,566,164 | 10/1996 | Ohlson | 375/208 X |

*Primary Examiner*—Young T. Tse
*Attorney, Agent, or Firm*—Hoffmann & Baron, LLP

[57] ABSTRACT

A virtual beam system operating in an environment, including a non-compatible receiver, includes a transmitting subsystem and a receiving subsystem. The transmitting subsystem includes an array of transmitting elements and an element position encoded composite signal generator for generating an element position encoded composite signal. The array of transmitting elements is operatively coupled to the signal generator. The transmitting subsystem radiates the element position encoded composite signal via the array of transmitting elements. The receiving subsystem is responsive to the element position encoded composite signal and includes a receiving element and an element position encoded composite signal decoder for decoding the element position encoded composite signal. The receiving element is operatively coupled to the signal decoder. The element position encoded composite signal appears to be radiated as a wide beam, with relatively low directive gain, when received and decoded by the non-compatible receiver. Conversely, the element position encoded composite signal appears to be radiated as a narrow beam, with relatively high directive gain, when received by the receiving element and decoded by the signal decoder of the receiving subsystem.

26 Claims, 4 Drawing Sheets

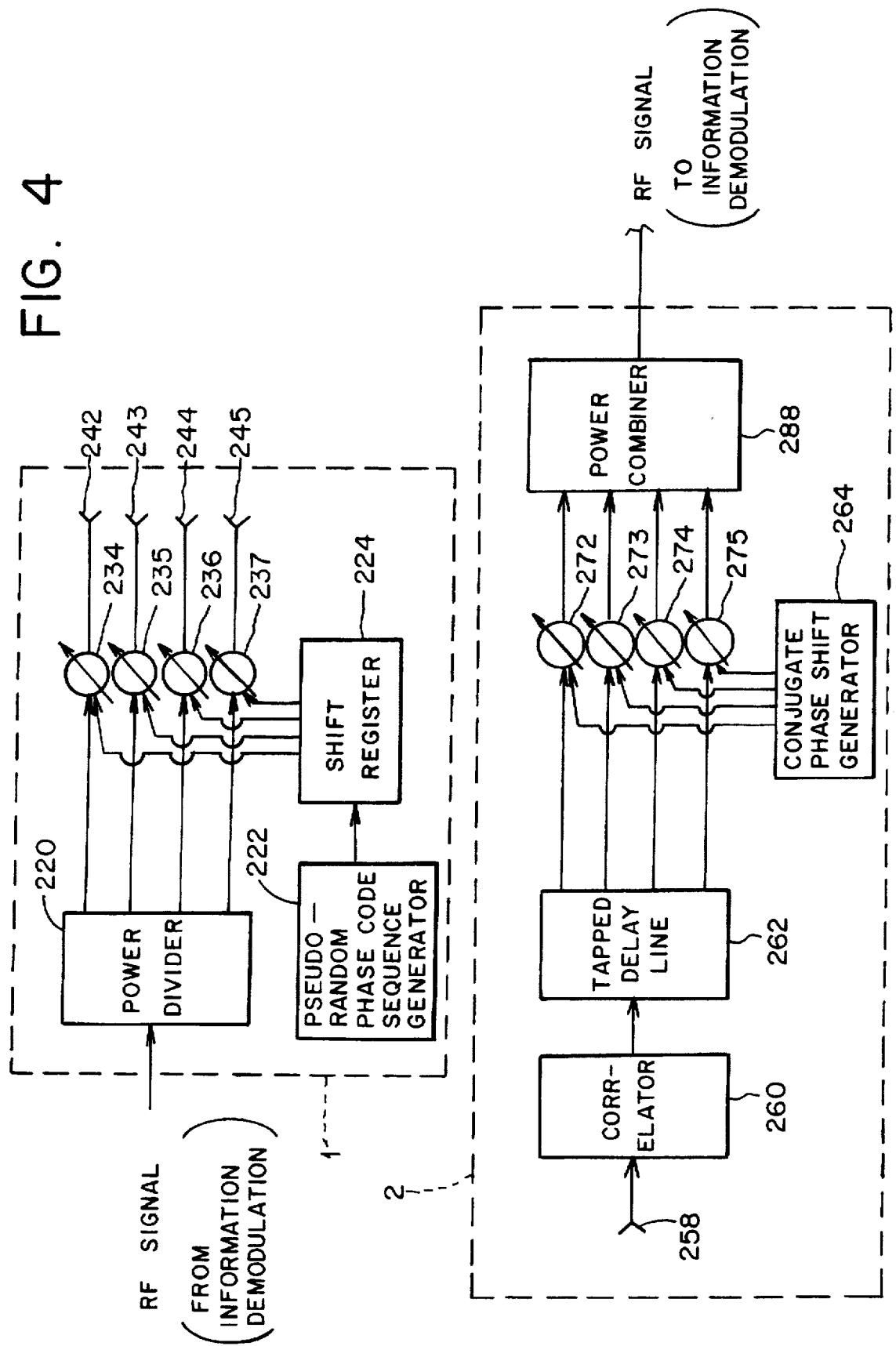

1

VIRTUAL BEAM SYSTEM

FIELD OF THE INVENTION

The present invention relates to the operation of communication systems and radar systems, and more particularly relates to methods and systems for providing a low probability of interception of transmissions.

BACKGROUND OF THE INVENTION

The design of communication systems involves many interrelated issues. Two of the most important issues are privacy and multiple user accessibility. Private communication (or covert communication in military applications) is a goal sought to be accomplished by most communication systems. The ability to prevent unwanted parties from intercepting and eavesdropping on communications, intended to be private, is a major issue that must be considered during system design. Additionally, the ability for multiple users to have simultaneous access to the channel through which the communication system operates is another important issue. Accordingly, given this demand for multiple user accessibility, the related issue of privacy becomes even more important. Further, it should be noted that the same design considerations that provide for communication privacy also can reduce mutual interference among multiple users, which is a problem inherent in multiple user systems.

Thus, communication systems, designed to address these interrelated issues, have employed techniques for minimizing the probability that any particular data transmitted over a communications system will be intercepted by an unintended recipient. These techniques are collectively referred to as low probability of interception (LPI) techniques.

One such LPI technique known as spread spectrum modulation is often employed to attempt to ensure a private communication link. In general, spread spectrum modulation is a modulation technique in which the frequency bandwidth of the modulated signal (i.e., radio frequency signal) is, in effect, spread significantly beyond the frequency bandwidth of the modulating signal (i.e., information signal). Further, the bandwidth of the modulated signal is not dependent upon the bandwidth of the modulating signal. In effect, the spread spectrum technique is a coded pulse compression technique which uses time and frequency domain conversion in an integration process which is coherent only for authorized listeners with compatible receiving equipment. Two methods of providing the desired bandwidth spread associated with spread spectrum modulation are known as direct sequence and frequency hop. Different variations of the direct sequence and frequency hop techniques are also employed, as well as combinations thereof.

The direct sequence spread spectrum technique involves multiplying a signal, modulated by some coherent digital technique such as phase shift keying, with a spreading code. The spreading code has the correlation properties of a pseudo-noise sequence, that is, a noise-like sequence that is actually deterministic in nature. At the receiver end of the communication system, ideally, the spreading code is available and is also time-synchronized with the code used to spread the signal. Thus, the signal is "unspread", or returned to its narrow bandwidth, while any interference or noise picked up during transmission remains spread and, thus, effectively suppressed. The signal, which was originally modulated by a coherent digital technique, such as phase shift keying, is then demodulated in the appropriate manner.

The frequency hop spread spectrum technique essentially involves "hopping" the modulated signal in a pseudo-random manner within a set of frequencies. Again, a signal, modulated in some manner, is mixed with a hopping code at the transmitting end and then mixed with a local oscillator offset in frequency by a synchronized hopping code at the receiving end to regenerate the original signal. Because the modulated signal is pseudo-randomly frequency hopped, an unwanted eavesdropper does not know which frequency band to monitor and thus must monitor the full frequency bandwidth in which the signal is hopped. By having to do so, the eavesdropper is faced with the disadvantage of dealing with the entire noise spectrum associated with this full frequency bandwidth.

However, while these spread spectrum techniques attempt to lower the probability of interception or jamming of data being transmitted by a communication system, these techniques, like all other existing LPI techniques, suffer from certain disadvantageous limitations. For instance, the processing gain of existing LPI techniques is limited by practical considerations. Processing gain is a quantification of the bandwidth disadvantage suffered by the eavesdropper as a result of spectrum spreading. Processing gain is equal to the ratio of spread bandwidth to despread bandwidth. This ratio is called processing gain because the ratio is also equal to the gain in the ratio of signal to noise plus interference which results from coherent processing to despread. Sometimes one-tenth of the common logarithm of this ratio is used to specify processing gain in dB. In the case of spread spectrum modulation, the processing gain is a function of the number of chips that can be summed. A chip refers to a discrete spreading code sequence. An attempt to increase the chip number, in an effort to increase processing gain, excessively limits the bandwidth of the data transfer because of the corresponding increase in integration (i.e., summation) time. Likewise, if the integration time is held constant and the number of chips is increased, the system encounters problems because the phase and timing tolerances are too stringent due to the individual chip lengths being too short. Thus, as is evident, the fundamental limitation associated with common LPI techniques, such as spread spectrum, is that the processing gain is directly related to the integration time of a single summation and, thus, the inherent disadvantage associated with attempting to increase the length of that individual summation.

Some radar systems also are designed to minimize the probability that the beams they use to illuminate targets will be detected by receivers other than the one used by the radar system to detect target echos. Spread spectrum LPI techniques are often employed for this purpose. However, the use of spread spectrum in a radar system is subject to the same processing gain limitations as in a communication system.

As a direct result of this limited processing gain, an eavesdropper can intercept data. The area of range in which an eavesdropper can intercept data includes the area between the transmitter and a minimum range equivalent to a fraction of the maximum transmission range of the communication system. This fraction is the reciprocal of the square root of the processing gain (the latter expressed as a bandwidth ratio rather than in dB). Thus, despite the application of existing LPI techniques, data transmissions may be intercepted in this region between the transmitter and this minimum range.

OBJECTS AND SUMMARY OF THE INVENTION

It is an object of the present invention to provide a system for, and method of, increasing the processing gain realized by a communication or radar system.

It is another object of the present invention to provide a communication or radar system with improved LPI techniques.

It is yet another object of the present invention to provide a communication or radar system which is capable of private transmission to multiple receivers disbursed over a wide angular sector.

It is a further object of the present invention to provide a communication or radar system which is capable of private transmission to a single receiver whose location is known only to within a wide angular sector.

It is still a further object of the present invention to provide a communication or radar system which provides multiple user accessibility while simultaneously suppressing mutual interference.

It is yet another object of the present invention to provide a communication or radar system which is capable of combining spread spectrum modulation with the improved LPI techniques of the present invention in order to increase the processing gain realized by the communication or radar system.

In accordance with one form of the present invention, a communication or radar system which forms a coded beam, referred to hereinafter as a "virtual beam system", as the beam formed is truly virtual and not detectable to non-compatible receivers, operating in an environment including at least one non-compatible receiver, includes a transmitting subsystem, the transmitting subsystem including an array of transmitting elements and means for generating an element position encoded composite signal. The array of transmitting elements is operatively coupled to the signal generating means, thereby allowing the transmitting subsystem to radiate the element position encoded composite signal via the array of transmitting elements. The virtual beam system also includes a receiving subsystem, the receiving subsystem being responsive to the element position encoded composite signal. The receiving subsystem includes at least one receiving element and means for decoding the element position encoded composite signal. The at least one receiving element is operatively coupled to the signal decoding means.

In accordance with the present invention, the element position encoded composite signal appears to have been radiated as a wide beam, with relatively low directive gain, when received by the at least one non-compatible receiver. Conversely, the element position encoded composite signal appears to have been radiated as a narrow beam, with relatively high directive gain, when received by the at least one receiving element and decoded by the signal decoding means of the receiving subsystem.

In accordance with another form of the present invention, a virtual beam system for achieving a relatively high processing gain by forming a narrow virtual transmit beam, where the system is responsive to a signal introduced thereto, includes at least one transmitting subsystem and at least one receiving subsystem. The at least one transmitting subsystem includes a transmitting antenna array composed of a plurality of transmitting elements. Each one of the plurality of transmitting elements has a position spaced apart from each other. The at least one transmitting subsystem also includes first dividing means. The first dividing means is responsive to the signal introduced to the at least one transmitting subsystem and generates a plurality of constituent signals including one constituent signal for each one of the plurality of transmitting elements.

Further, the system also includes means for element position encoding. The element position encoding means is responsive to the plurality of constituent signals. The element position encoding means itself includes means for uniquely marking each one of the plurality of constituent signals, the marking means providing each one of the plurality of constituent signals with a unique marking which represents the position of each one of the plurality of transmitting elements in the antenna array. Further, the element position encoding means includes means for pseudo-randomly phase shifting each one of the plurality of constituent signals, the pseudo-random phase shifting means imparting a pseudo-random phase shift on each one of the plurality of constituent signals. The pseudo-random phase shift associated with each one of the plurality of constituent signals is imparted to substantially reduce the probability that the plurality of constituent signals will be intercepted upon transmission.

Thus, at the at least one transmitting subsystem, each one of the plurality of transmitting elements of the transmitting antenna array respectively radiates one of the plurality of constituent signals. Further, radiation oblique to the plurality of transmitting elements imparts an additional phase shift on each one of the plurality of constituent signals. Subsequently, the plurality of constituent signals, further phase shifted by the oblique radiation, forms a transmitted composite signal. This composite signal does not form a real beam in any direction because of the pseudo-random phasing of the plurality of the constituent signals of which it is composed.

The at least one receiving subsystem of the virtual beam system formed in accordance with the present invention includes at least one receiving element. The at least one receiving element is responsive to the transmitted composite signal radiated by the transmitting antenna array. Further, the at least one receiving subsystem includes a second dividing means. The second dividing means is responsive to the transmitted composite signal and divides the transmitted composite signal into a plurality of transmitted composite signal positions.

Still further, the at least one receiving subsystem includes means for element position decoding. The element position decoding means is responsive to the plurality of transmitted composite signal portions, and itself includes separation means, first removing means, second removing means and third removing means. The separation means separates each of the received constituent signals from the plurality of transmitted composite signal portions. The first removing means removes the unique marking provided by the marking means from the plurality of received constituent signals. The second removing means removes the pseudo-random phase shift imparted by the pseudo-random phase shifting means from the plurality of received constituent signals. The third removing means removes the phase shift imparted by the radiation oblique to each one of the plurality of transmitting elements from the plurality of received constituent signals.

Lastly, the at least one receiving subsystem includes means for coherently combining the plurality of received constituent signals to effectively form a narrow virtual transmit beam thereby allowing the at least one receiving subsystem to realize a relatively high processing gain. This gain is equal to the directivity which the transmitting antenna array could have produced if its elements were phased to produce a real beam in the direction of the receiving subsystem.

It is to be appreciated that the signal introduced to the virtual beam system is preferably a product of spread spectrum modulation. Further, the marking means preferably includes frequency synthesizing means. The frequency synthesizing means respectively converts the frequency of the signal introduced to the at least one transmitting subsystem to a plurality of different frequencies. The plurality of different frequencies are evenly spaced, being offset from each other by a common difference frequency. Each one of the plurality of the different frequencies is respectively associated with one of the plurality of constituent signals, and the plurality of different frequencies are derived from a single reference frequency and thus are coherent with respect to one another. In still another form of the present invention, the plurality of different frequencies generated by the frequency synthesizing means of the element position encoding means, are pseudo-randomly spaced with respect to one another. For example, in such a case, the frequencies are still derived from a common reference frequency; however, each frequency may be offset from the other frequencies by a pseudo-randomly spaced multiple of the common difference frequency.

In yet another form of the present invention, the element position encoding means preferably includes time offsetting means. The time offsetting means causes each one of the plurality of constituent signals to be respectively radiated by one of the plurality of transmitting elements at a plurality of different times. The plurality of different times are pseudo-randomly spaced with respect to one another.

In still a further form of the present invention, the element position encoding means preferably includes means for encoding each one of the plurality of constituent signals with a different pseudo-random phase code sequence. The encoding means provides each one of the plurality of constituent signals with the unique marking and the pseudo-random phase shift associated with the present invention.

In yet another form of the present invention, the pseudo-random phase shift associated with the pseudo-random phase shifting means is provided by a time stationary pseudo-random phase code. Alternatively, in still a further form of the present invention, the pseudo-random phase shift is provided by a time varying pseudo-random phase code.

In accordance with yet another form of the present invention, a virtual beam system for achieving a relatively high processing gain by forming a narrow virtual transmit beam, where the system is responsive to a signal introduced thereto, includes at least one transmitting subsystem and at least one receiving subsystem. The at least one transmitting subsystem includes a transmitting antenna array. The transmitting antenna array further includes a plurality of transmitting elements, each one of the plurality of transmitting elements having a position spaced apart from each other. Further, the at least one transmitting subsystem includes a first power divider. The first power divider is responsive to the signal and divides the signal into a plurality of constituent signals including one constituent signal for each one of the plurality of transmitting elements.

Still further, the at least one transmitting subsystem includes a transmitter RF (radio frequency) processor circuit. The transmitter RF processor circuit is responsive to the plurality of constituent signals and synthesizes a plurality of different synthesized frequencies. The plurality of different synthesized frequencies are evenly spaced, being offset from each other by a common difference frequency. Each one of the plurality of different synthesized frequencies is respectively associated with one of the plurality of constituent signals. The different synthesized frequencies are also coherent with respect to one another. Thus, the transmitter RF processor circuit thereby generates a plurality of synthesized constituent signals.

The at least one transmitting subsystem also includes a plurality of pseudo-random phase shifters. The plurality of pseudo-random phase shifters is responsive to the plurality of synthesized constituent signals and imparts a pseudo-random phase shift on each one of the plurality of synthesized constituent signals. Thus, the plurality of pseudo-random phase shifters thereby generates a plurality of pseudo-randomized constituent signals.

Accordingly, the transmitting antenna array is responsive to the plurality of pseudo-randomized constituent signals and, thus, each one of the plurality of transmitting elements of the transmitting antenna array respectively radiates one of the plurality of pseudo-randomized constituent signals. Further, radiation oblique to the plurality of transmitting elements imparts an additional phase shift on each one of the plurality of pseudo-randomized constituent signals. The plurality of pseudo-randomized constituent signals, further phase shifted by the oblique radiation, forms a transmitted composite signal.

The at least one receiving subsystem of the virtual beam system includes at least one receiving element. The at least one receiving element is responsive to the transmitted composite signal radiated by the at least one transmitting subsystem.

Further, the at least one receiving subsystem includes a second power divider. The second power divider is responsive to the transmitted composite signal and divides the transmitted composite signal into a plurality of transmitted composite signal portions.

Still further, the at least one receiving subsystem includes a receiver RF processor circuit. The receiver RF processor circuit is responsive to the plurality of transmitted composite signal portions. The receiver RF processor circuit separates the plurality of received constituent signals from the transmitted composite signal portions, and realigns the plurality of received constituent signals by converting the plurality of different synthesized frequencies associated with the plurality of received constituent signals to a common frequency. Further, the receiver RF processor circuit realigns the plurality of received constituent signals by removing the pseudo-random phase shift and the oblique radiation phase shift imparted by the at least one transmitting subsystem. Thus, the receiver RF processor circuit generates a plurality of realigned received constituent signals.

Lastly, the at least one receiving subsystem includes a power combiner. The power combiner is responsive to the plurality of realigned received constituent signals. The power combiner coherently combines the plurality of realigned received constituent signals and thereby generates a received composite signal. The received composite signal effectively forms a narrow virtual transmit beam and thereby allows the at least one receiving subsystem to realize the relatively high processing gain which is not available to the eavesdropper.

It is to be appreciated that the transmitter RF processor circuit preferably includes a frequency synthesizer. The frequency synthesizer generates a plurality of synthesizer signals, where the plurality of synthesizer signals exhibit a plurality of different synthesizer frequencies. The plurality of different synthesizer frequencies are coherent with respect to one another. Each one of the plurality of synthesizer signals respectively exhibits one of the plurality of different synthesizer frequencies. Further, the transmitter RF processor circuit preferably includes a plurality of mixers. The plurality of mixers is responsive to the plurality of synthesizer signals and the plurality of constituent signals. The plurality of mixers mixes the plurality of synthesizer signals with the plurality of constituent signals and thereby generates the plurality of synthesized constituent signals.

The receiver RF processor circuit preferably includes a frequency synthesizer. The frequency synthesizer generates a plurality of synthesizer signals, which exhibit a plurality of different synthesizer frequencies. The plurality of different synthesizer frequencies may have a common offset but otherwise match the plurality of different frequencies generated by the transmitter frequency synthesizer. Each one of the plurality of synthesizer signals respectively exhibits one of the plurality of different synthesizer frequencies. Further, the receiver RF processor circuit preferably includes a plurality of conjugate phase shifters. The plurality of conjugate phase shifters is responsive to the plurality of synthesizer signals and each phase shifter respectively imparts a conjugate phase shift on each one of the plurality of synthesizer signals. The conjugate phase shift is substantially equivalent to the conjugate of the sum of the pseudo-random phase shift and the oblique radiation phase shift imparted by the at least one transmitting subsystem. Thus, the plurality of conjugate phase shifters generates a plurality of phase shifted signals.

Still further, the receiver RF processor circuit preferably includes a plurality of mixers. The plurality of mixers is responsive to the plurality of phase shifted signals and the plurality of transmitted composite signal portions and mixes the plurality of phase shifted signals with the plurality of transmitted composite signal portions. Thus, the plurality of mixers generates a plurality of mixed transmitted composite signal portions which are realigned in frequency and phase.

Lastly, the receiver RF processor circuit preferably includes a plurality of bandpass filters which have a common bandpass frequency. Because of the frequency realignments of the plurality of mixed realigned transmitted composite signal portions, each of the plurality of bandpass filters is responsive to a unique realigned received constituent signal from the group of constituent signals which make up each of the plurality of realigned mixed transmitted composite signal portions. Thus, the receiver RF processor generates the plurality of realigned received constituent signals exhibiting a common frequency.

In accordance with still a further form of the present invention, a virtual beam system for achieving a relatively high processing gain by forming a narrow virtual transmit beam is similar to the previously discussed embodiment except for the transmitter RF processor circuit and the receiver RF processor circuit. In this particular embodiment, similar to the embodiment previously discussed, the transmitter RF processor circuit is responsive to the plurality of constituent signals and synthesizes a plurality of different synthesized frequencies. However, in this case, the different synthesized frequencies, which are respectively associated with the plurality of constituent signals, are pseudo-randomly spaced with respect to one another. Thus, a plurality of pseudo-random phase shifters is not needed in this particular embodiment since the transmitter RF processor circuit provides the pseudo-randomization necessary to prevent the formation of a real beam in free space.

Also, similar to the previous embodiment, the receiver RF processor circuit of this particular embodiment separates the plurality of received constituent signals from the transmitted composite signal portions, realigns the plurality of received constituent signals by converting the plurality of different synthesized frequencies associated with the plurality of received constituent signals to a common frequency, and removes the oblique radiation phase shift imparted by the at least one transmitting subsystem. However, in this particular embodiment, the receiver RF processor circuit does not remove any separate pseudo-random phase shift because the pseudo-randomization was provided by the synthesized frequencies associated with the received constituent signals.

In accordance with yet another form of the present invention, a virtual beam system for achieving a relatively high processing gain by forming a narrow virtual transmit beam, where the system is responsive to an information signal introduced thereto, includes at least one transmitting subsystem and at least one receiving subsystem. The at least one transmitting subsystem itself includes a transmitting antenna array. The transmitting antenna array further includes a plurality of transmitting elements, each one of the plurality of transmitting elements having a position spaced apart from each other.

Further, the at least one transmitting subsystem includes a first power divider. The first power divider is responsive to the information signal and divides the information signal into a plurality of constituent signals including one constituent signal for each one of the plurality of transmitting elements. Still further, the at least one transmitting subsystem includes a plurality of pseudo-random phase shifters. The pseudo-random phase shifters are responsive to the plurality of constituent signals and are respectively driven by a first plurality of different pseudo-random phase code sequences. The pseudo-random phase shifters respectively encode and modulate each one of the plurality of constituent signals and thereby generate a plurality of pseudo-randomized constituent signals.

Subsequently, the transmitting antenna array is responsive to the plurality of pseudo-randomized constituent signals, whereby each one of the plurality of transmitting elements respectively radiates one of the plurality of pseudo-randomized constituent signals. Further, radiation oblique to the plurality of transmitting elements imparts an additional phase shift on the plurality of pseudo-randomized constituent signals. The plurality of pseudo-randomized constituent signals, further phase shifted by the oblique radiation, forms a transmitted composite signal.

The at least one receiving subsystem of the virtual beam system includes at least one receiving element. The at least one receiving element is responsive to the transmitted composite signal radiated by the at least one transmitting subsystem. Further, the at least one receiving subsystem includes a second power divider. The second power divider is responsive to the transmitted composite signal and divides the transmitted composite signal into a plurality of transmitted composite signal portions.

Still further, the at least one receiving subsystem includes a plurality of correlators. The correlators are responsive to the plurality of transmitted composite signal portions and are respectively driven by a second plurality of different pseudo-random phase code sequences. The second pseudo-random phase code sequences are complementary to the first plurality of pseudo-random phase code sequences of the at least one transmitting subsystem. The plurality of correlators respectively separate, decode and demodulate each one of the plurality of received constituent signals contained in the transmitted composite signal portions. Thus, the plurality of correlators generates a plurality of decoded constituent signals.

The at least one receiving subsystem also includes a plurality of conjugate phase shifters. The plurality of conjugate phase shifters is responsive to the plurality of decoded constituent signals and removes the oblique radiation phase shift imparted at the at least one transmitting subsystem. Thus, the plurality of conjugate phase shifters generates a plurality of cophasal constituent signals. Lastly, the at least one receiving subsystem includes a power combiner. The power combiner is responsive to the plurality of cophasal constituent signals and coherently combines the plurality of cophasal constituent signals. Thus, the power combiner generates a received composite signal. The received composite signal effectively forms a narrow virtual transmit beam and thereby allows the at least one receiving subsystem to realize the relatively high processing gain.

In accordance with still a further form of the present invention, similar to the previously discussed embodiment, the virtual beam system is responsive to a modulated signal, rather than an information signal, introduced thereto. Thus, the at least one transmitting subsystem merely encodes each one of the plurality of constituent signals, while the at least one receiving subsystem merely decodes each one of the plurality of received constituent signals. It is to be appreciated that the modulated signal introduced to the virtual beam system, formed in accordance with this particular embodiment, may be modulated in any manner known to persons skilled in this art.

In accordance with yet another form of the present invention, a virtual beam system responsive to an information signal, is similar to the code multiplexing embodiments previously discussed. However, in this particular embodiment, each one of the first plurality of different pseudo-random phase code sequences is a derivative of a common pseudo-random phase code. Further, a single correlator performs the decoding and demodulating functions that the plurality of correlators performed in the previous embodiments.

Again, in accordance with the single correlator form of the present invention, discussed above, it is to be appreciated that the signal to which the virtual beam system is responsive may have previously been modulated and, thus, the at least one transmitting subsystem must merely encode the plurality of constituent signals, while the at least one receiving subsystem merely decodes the plurality of received constituent signals.

In a method according to one form of the present invention, a relatively high processing gain is achieved from a narrow virtual transmit beam associated with a virtual beam system which includes at least one transmitting subsystem and at least one receiving subsystem. The method includes, at the at least one transmitting subsystem, dividing a signal into a plurality of constituent signals. The plurality of constituent signals quantitatively corresponds to a plurality of transmitting elements associated with the at least one transmitting subsystem.

Further, the method includes element position encoding the plurality of constituent signals. The element position encoding step itself includes the steps of uniquely marking each one of the plurality of constituent signals, the marking step providing each one of the plurality of constituent signals with a unique marking. The unique marking represents a position of each one of the plurality of transmitting elements in the at least one transmitting subsystem. Further, the element position encoding step includes pseudo-randomly phase shifting each one of the plurality of constituent signals. The pseudo-random phase shifting step imparts a pseudo-random phase shift on each one of the plurality of constituent signals to thereby substantially reduce a probability that the plurality of constituent signals will form a real beam which can be intercepted upon transmission.

Further, the method includes radiating each one of the plurality of constituent signals, respectively, from one of the plurality of transmitting elements, whereby an additional phase shift is imparted on each one of the plurality of constituent signals due to radiation oblique to the plurality of transmitting elements. The plurality of constituent signals, further phase shifted by the oblique radiation, forms a transmitted composite signal.

Next, at the at least one receiving subsystem, the method includes receiving the transmitted composite signal and dividing the transmitted composite signal into a plurality of transmitted composite signal portions. The plurality of transmitted composite signal portions quantitatively corresponds to the plurality of constituent signals. Further, the method includes separating the plurality of received constituent signals from the transmitted composite signal portions and removing the unique marking, provided during the unique marking step, associated with the plurality of received constituent signals. Also, the method includes removing the pseudo-random phase shift, imparted during the pseudo-random phase shifting step, associated with the plurality of received constituent signals. Still further, the method includes removing the phase shift, imparted during the radiating step by the oblique radiation, associated with the plurality of received constituent signals. Lastly, the method includes coherently combining the plurality of received constituent signals to effectively form a narrow virtual transmit beam thereby allowing the at least one receiving subsystem to realize the relatively high processing gain.

Previously, communication systems attempted to provide private communication links to multiple system users by employing such LPI techniques as spread spectrum modulation. A system employing spread spectrum technology realized its processing gain through coded pulse compression techniques. Such prior art systems used time and frequency domain conversion in an integration process which yielded summations. A direct relationship existed between increasing the length of this summation and realizing increased system processing gain. However, as previously discussed, it became impractical to increase the length of this summation indefinitely. Also, by doubling the length of a summation, the resulting system processing gain increased by only 3 dB. Thus, for all practical purposes, the processing gain of these existing systems is limited.

Surprisingly, it has been discovered that augmenting the system to provide an additional, independent and orthogonal LPI technique yielding a second summation, may significantly increase the processing gain of the system by approximately 20 to 30 dB. This second summation, provided by the present invention, provides a significant increase in processing gain by employing a coded angular compression technique. Such a technique, employed by a system formed in accordance with the present invention, uses time and angular (i.e., spatial) domain conversion in an integration process which, like spread spectrum, is coherent only for authorized listeners with compatible receiving equipment. Thus, by multiplying the summation yielded by conventional spread spectrum techniques with the summation yielded by the present invention, a significant increase in system processing gain is realized.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a functional block diagram of yet another embodiment of a virtual beam system formed in accordance with the present invention.

DETAILED DESCRIPTION OF THE PREFERRED EMBODIMENTS

Figure 1:
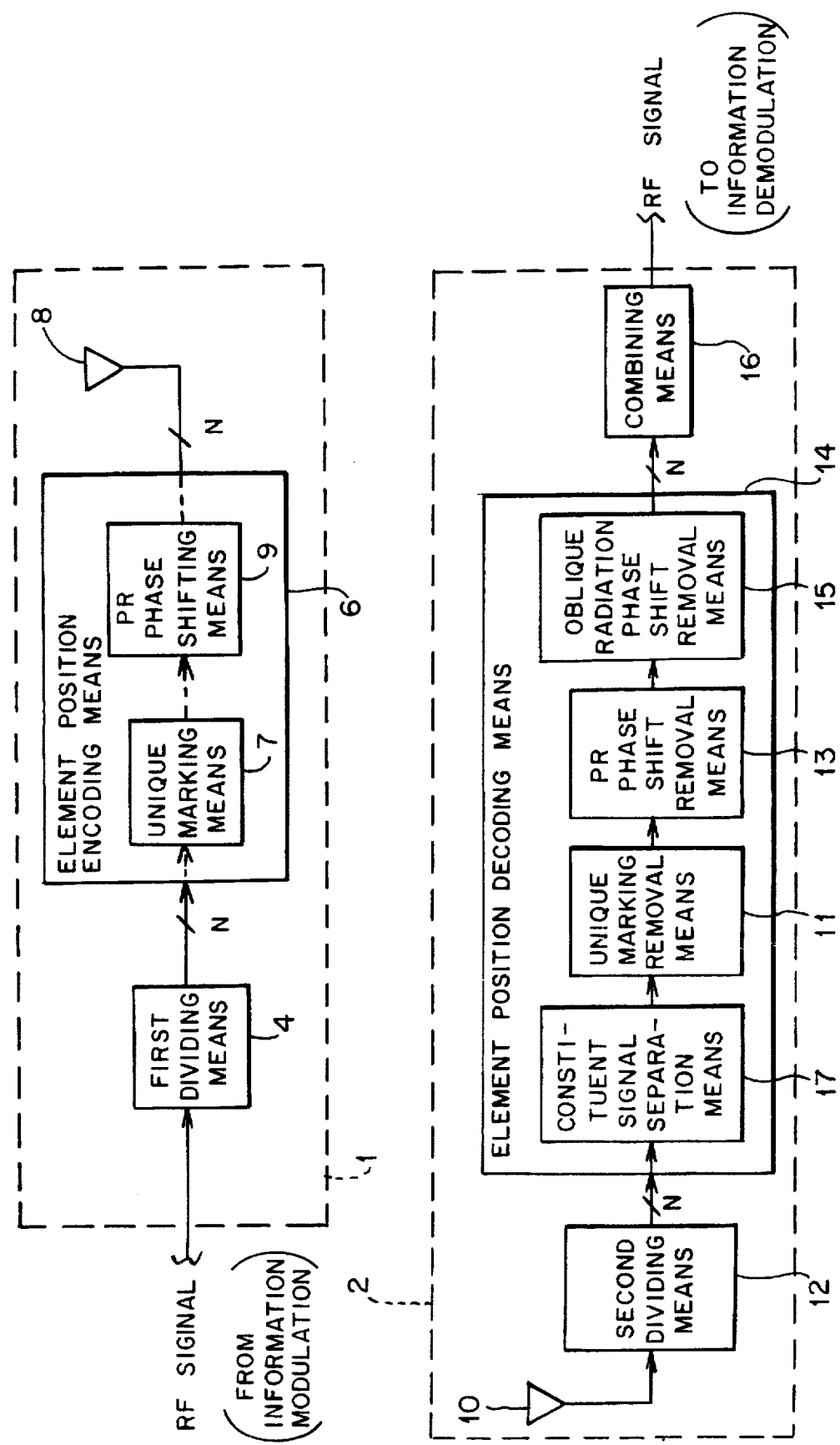
FIG. 1 is a simplified functional block diagram illustrating a virtual beam system formed in accordance with the present invention.

Referring initially to FIG. 1, a simplified functional block diagram of a virtual beam system, formed in accordance with the present invention, is illustrated. The present invention is essentially composed of a transmitting subsystem 1 and a receiving subsystem 2. The transmitting subsystem 1, illustrated within the dashed lines, is composed of first dividing means 4, transmitting antenna array 8, and element position encoding means 6 which is operatively coupled between the transmitting antenna array 8 and the first dividing means 4. Transmitting antenna array 8 is further composed of a quantity, N, of individual transmitting elements (not shown). The receiving subsystem 2, illustrated within the dashed lines, is composed of receiving antenna 10, element position decoding means 14, second dividing means 12 which is operatively coupled between element position decoding means 14 and receiving antenna 10, and combining means 16 which is operatively coupled to element position decoding means 14.

In general, the virtual beam system of the present invention operates in the following manner. A radio frequency (RF) signal is introduced to the transmitting subsystem 1 at the first dividing means 4. It is to be appreciated that the RF signal may or may not be spread spectrum modulated prior to being introduced to the transmitting subsystem 1. The RF signal is divided into N parts by the first dividing means 4 or, in other words, the RF signal is preferably divided into as many constituent signals as there are individual transmitting elements in the transmitting antenna array 8. These N constituent signals are each characterized by possessing 1/Nth of the input power associated with the original RF signal introduced to the transmitting subsystem 1.

These constituent signals are then introduced to element position encoding means 6. Element position encoding means 6 performs two functions. First, each one of the constituent signals is uniquely marked via a unique marking means 7. Second, each one of the constituent signals is pseudo-randomly phase shifted via a pseudo-random phase shifting means 9.

The unique marking that each constituent signal receives represents the respective position which the particular transmitting element of the transmitting antenna array 8, which will radiate that particular constituent signal, occupies in the antenna array. The predominant reason for uniquely marking each constituent signal is to enable later separation of constituent signals from the transmitted composite signal radiated by the transmitting antenna array 8. It is to be appreciated that several methods of uniquely marking each constituent signal may be employed. For instance, each constituent signal may be frequency synthesized. In other words, a frequency associated with each one of the constituent signals may be synthesized (i.e., converted or transformed) by offsetting each frequency from the other frequency by multiples of a coherently derived, common difference. Thus, each constituent signal will have a unique frequency that is coherent with the frequencies of the other signals.

The unique marking may also be accomplished via time offsetting or multiplexing. Under this approach, each constituent signal is radiated from a respective transmitting element at a coherently different time. Further, the unique marking may be accomplished via code multiplexing, where each constituent signal is encoded by a unique orthogonal code. It is to be understood that other methods of uniquely marking each constituent signal, known to persons skilled in this art, may be employed. Specific embodiments employing some of the unique marking approaches described above will be discussed in greater detail later in this detailed description.

Next, the element position encoding means 6 pseudo-randomly phase shifts each constituent signal. This is accomplished by pseudo-random phase shifting means 9. The pseudo-random phase shift may be accomplished by shifting each constituent signal with a different time stationary pseudo-random phase code (the code is a function of position rather than time). The predominant reason for pseudo-randomly phase shifting each constituent signal is to prevent real beam formation (i.e., coherent addition of the constituent signals for particular directions in space). The prevention of real beam formation is critical to the underlying goal of a private communication system, that is, achieving private communications.

Thus, while each constituent signal is uniquely marked in order to identify the signal with the particular transmitting element which the signal was radiated from, means for pseudo-randomizing the constituent signals must be provided or else an unintended eavesdropper could easily intercept and process the constituent signals, thereby surreptitiously attaining access to the information contained therein. However, in accordance with the present invention, by pseudo-randomizing the constituent signals at the transmitting subsystem 1, only a compatible receiving subsystem with the capability of decoding the pseudo-random phase shift could develop sufficient signal to noise ratio to process and extract the information contained in the constituent signals at the intended distance from the transmitter.

It is to be appreciated that the unique marking means 7 may also provide the pseudo-random phase shift. For instance, the frequency synthesizing approach, discussed above, may convert the frequency of each constituent signal such that each frequency may be pseudo-randomly offset (i.e., spaced) from the frequencies associated with the other constituent signals. Likewise, if code multiplexing is employed in the unique marking process, a pseudo-random phase code may simultaneously provide the unique marking and the pseudo-random phase shift. Further, pseudo-randomly spaced time differences would yield a similar advantageous result if the time offsetting approach were employed.

Accordingly, after the element position encoding means 6 performs the unique marking and pseudo-random phase shifting functions, the N constituent signals are respectively radiated via the N transmitting elements of the transmitting antenna array 8. Consequently, another phase shift is imparted on each constituent signal upon radiation. Radiation oblique (i.e., not perpendicular) to the plane of the transmitting array imparts a phase shift on each constituent signal as the signal is radiated by each transmitting element. Accordingly, upon being radiated by the array, the constituent signals form a transmitted composite signal in free space.

Still referring to FIG. 1, the transmitted composite signal is received by the receiving subsystem 2, in particular, by the receiving antenna 10. Receiving antenna 10, in a preferred embodiment, is composed of one receiving element; however, alternative embodiments may include more than one receiving element and still achieve the unique advantages of the present invention. The transmitted composite signal, received by the receiving antenna 10, is presented to the second dividing means 12. Second dividing means 12 divides the transmitted composite signal into N transmitted composite signal portions. The transmitted composite signal portions are then presented to the element position decoding means 14.

Accordingly, the element position decoding means 14 performs four functions. First, the element position decoding means 14, via separation means 17, separates each of the received constituent signals from the plurality of transmitted composite signal portions. Second, the element position decoding means 14, via unique marking removal means 11, removes the unique marking applied to each constituent signal at the transmitting subsystem 1. That is, if the received constituent signals are uniquely marked by frequency or time offsetting, then the constituent signals are subsequently realigned in frequency or time, respectively. Likewise, if the constituent signals are code multiplexed, the corresponding complementary code is applied to each constituent signal in order to remove the unique marking. Depending on the type of marking, the function of removing the marking and the prior function of separation may be merged into a common operation via a single common means. Third, the element position decoding means 14, via the pseudo-random phase shift removal means 13, removes the pseudo-random phase shift, imparted by the phase shifting means, in a manner corresponding to the method used to impart the pseudo-random phase shift. Lastly, the element position decoding means 14, via the oblique radiation phase shift removal means 15, removes the phase shift imparted by the radiation oblique to the transmitting elements.

Subsequently, combining means 16 combines (i.e., coherently adds) the resulting signal voltages of the received constituent signals thereby forming a received composite signal, which may then be demodulated to extract the information contained therein. Advantageously, the resulting power associated with the received composite signal is $N^2$ times the power received from each transmitting element, or equivalently, N times the power which would have been received if all the input power were radiated by a single transmitting element. Thus, as is evident from the above description, the processing gain realized by the receiving subsystem formed in accordance with the present invention is directly related to N, that is, the processing gain increases as N increases.

Further, the processing gain of the receiving subsystem 2 is also actually equivalent to the directive gain associated with the transmitted composite signal. This transmitted composite signal is referred to as a virtual beam because of the fact that such a relatively high processing gain is only achievable by a receiving subsystem which is able to element position decode the transmitted composite signal. Accordingly, a receiving subsystem without this capability cannot coherently add the voltages from each received constituent signal to form the virtual beam; rather, such a non-compatible receiver can only add the power from each constituent signal (which does not require separation of constituent signals).

With respect to a non-compatible receiver, the resulting sum of power is N times the power received from each element, or equivalently, the power which would have been received if all the input power were radiated by a single transmitting element. In comparison, this power is 1/Nth the power received by the receiving subsystem of the present invention at the same range from the transmitting subsystem. Assuming this range is sufficient, the transmitted composite signal is undetectable by a non-compatible receiver, but easily detected by a receiving subsystem formed in accordance with the present invention. Thus, the range advantage associated with the present invention is the square root of this power advantage, that is, approximately 10 to 33 times for transmitting antenna arrays of 100 to 1,000 elements, respectively.

Further, this processing gain yielded by the present invention is independent of, and multiplies with, any additional processing gain achieved by concurrently employing spread spectrum modulation techniques. Thus, a processing gain of 100 (20 dB) which derives from a 100 element transmitting antenna array, formed in accordance with the present invention, would multiply with a spread spectrum processing gain of 1,000 (30 dB) to produce an overall gain of 100,000 (50 dB). Above 10 GHz, transmitting antenna arrays of a thousand elements or more are possible, thus yielding processing gains of over 30 dB (over 60 dB if multiplied with a spread spectrum processing gain).

Accordingly, the present invention allows the power radiated by the transmitting subsystem to be reduced by a like amount, which, in turn, advantageously reduces the range within which a non-compatible receiver can intercept information radiated by the transmitting subsystem. Thus, as previously discussed, the intercept range associated with a communication system which employs only the traditional spread spectrum technique with a typical processing gain of 30 dB would be approximately 1/33rd of the maximum range of the transmitter (derived from the square root of 1000, that is, the processing gain associated with the spread spectrum technique). However, the intercept range associated with a communication system formed in accordance with the present invention which employs the virtual beam technique and the traditional spread spectrum technique would be approximately 1/1000th of the maximum range of the transmitter (derived from the square root of 1,000,000, that is, the processing gain of 1000 associated with the spread spectrum technique multiplied by the processing gain of 1000 associated with the virtual beam technique).

Figure 2:
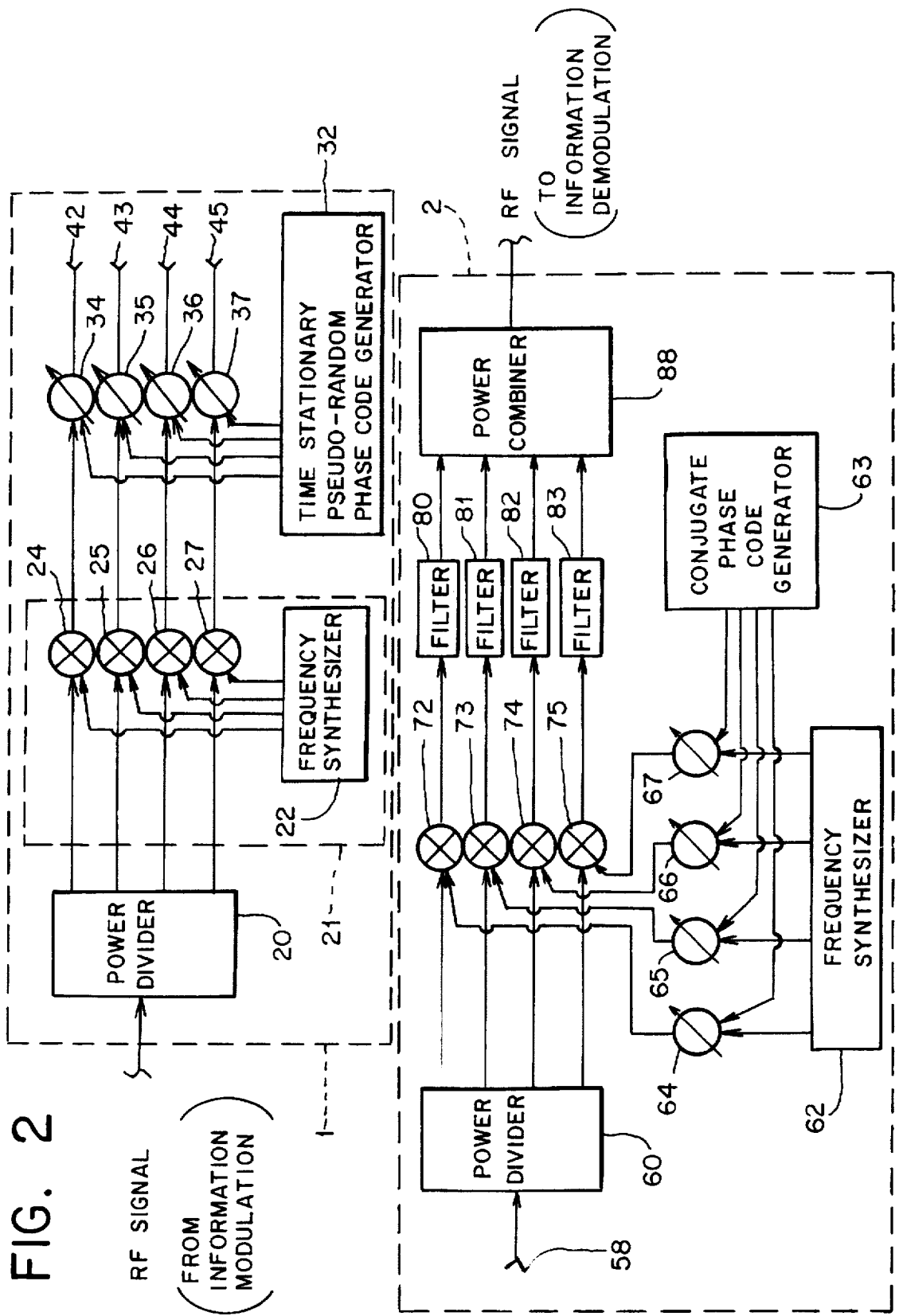
FIG. 2 is a functional block diagram of one embodiment of a virtual beam system formed in accordance with the present invention.

Referring now to FIG. 2, a functional block diagram of one embodiment of a virtual beam system, formed in accordance with the present invention, is illustrated. The virtual beam system, illustrated in FIG. 2, employs the frequency synthesizer approach, as previously discussed, for element position encoding and element position decoding. It is to be appreciated that the virtual beam system is essentially composed of a transmitting subsystem 1 and a receiving subsystem 2.

Transmitting subsystem 1, illustrated within the dashed lines, includes transmitting elements 42–45. It is to be understood that for the sake of simplicity this particular embodiment employs only four transmitting elements; however, a virtual beam system formed in accordance with the present invention is not so limited. Rather, practical embodiments having over a thousand transmitting elements are anticipated by the present invention. Transmitting subsystem 1 also includes power divider 20 having an input port and four output ports; a transmitter RF processor circuit 21 which includes a frequency synthesizer 22 having four output ports, and single sideband frequency conversion mixers 24–27, each having a first input port, a second input port and an output port; time stationary pseudo-random phase code generator 32 having four output ports; and pseudo-random phase shifters 34–37, each having a first input port, a second input port and an output port.

Accordingly, the first input ports of the mixers 24–27 are respectively coupled to the output ports of the power divider 20, while the second input ports of the mixers 24–27 are respectively coupled to the output ports of the frequency synthesizer 22. Further, the first input ports of the pseudo-random phase shifters 34–37 are respectively coupled to the output ports of the mixers 24–27, while the second input ports of the pseudo-random phase shifters 34–37 are respectively coupled to the output ports of the time stationary pseudo-random phase code generator 32. Lastly, the transmitting elements 42–45 are respectively coupled to the output ports of the pseudo-random phase shifters 34–37.

Receiving subsystem 2, illustrated within the dashed lines, includes receiving element 58, power divider 60 having an input port and four output ports, frequency synthesizer 62 having four output ports, conjugate phase shifters 64–67, each having a first input port, a second input port and an output port, conjugate phase code generator 63 having four output ports, mixers 72–75, each having a first input port, a second input port and an output port, bandpass filters 80–83, each having an input port and an output port, and power combiner 88 having four input ports and an output port.

Accordingly, the input port of power divider 60 is coupled to the receiving element 58. Further, the first input ports of the conjugate phase shifters 64–67 are respectively coupled to the output ports of the frequency synthesizer 62, while the second input ports of the conjugate phase shifters 64–67 are respectively coupled to the output ports of the conjugate phase code generator 63. Still further, the first input ports of the mixers 72–75 are respectively coupled to the output ports of the conjugate phase shifters 64–67, while the second input ports of the mixers 72–75 are respectively coupled to the output ports of the power divider 60. Lastly, the input ports of the bandpass filters 80–83 are respectively coupled to the output ports of the mixers 72–75, while the input ports of the power combiner 88 are respectively coupled to the output ports of the bandpass filters 80–83.

It is to be appreciated that, with respect to the transmitting subsystem 1, the function of the element position encoding means, as discussed in regard to FIG. 1, is performed by the frequency synthesizer 22, the single sideband frequency conversion mixers 24–27, the time stationary pseudo-random phase code generator 32, and the pseudo-random phase shifters 34–37. Further, with respect to the transmitting subsystem 1, the power divider 20 and the transmitting elements 42–45 respectively perform the functions associated with the first dividing means 4 and the transmitting antenna array 8, illustrated in FIG. 1.

Likewise, it is to be appreciated that, with respect to the receiving subsystem 2, the function of the element position decoding means 14, as discussed in regard to FIG. 1, is performed by the frequency synthesizer 62, the conjugate phase shifters 64–67, the conjugate phase code generator 63, the mixers 72–75, and the bandpass filters 80–83. Further, with respect to the receiving subsystem 2, the power divider 60, the power combiner 88, and the receiving element 58, respectively perform the functions associated with the second dividing means 12, the combining means 16, and the receiving antenna 10, illustrated in FIG. 1.

Accordingly, the virtual beam system of the present invention, as illustrated in FIG. 2, operates in the following manner. An RF signal is introduced to the transmitting subsystem 1 at the input port of power divider 20. It is to be appreciated that the RF signal may have been modulated, in any manner known to persons skilled in this art, prior to being introduced to power divider 20. Further, the RF signal is assumed to be a simple sinusoidal signal for purposes of describing this particular embodiment; however, it is to be understood that the RF signal may or may not be spread spectrum modulated prior to being introduced to the present invention.

Power divider 20 divides the RF signal and respectively generates four individual constituent signals (or more if a greater number of antenna elements are present) on the power divider's four output ports. Each of the constituent signals can be represented as:

$$V(t)_{rn} = V_n \sin \omega t$$

where $V_n$ is the amplitude (in voltage) of the nth (in this particular embodiment n equals 1 to 4) time varying constituent signal, and $\omega$ equals the frequency (in radians) of the RF signal. Concurrently, frequency synthesizer 22 generates four individual synthesizer signals, each synthesizer signal having a frequency which is a multiple of a coherently derived, common difference frequency $\delta$. Thus, the synthesizer signals, present on the output ports of frequency synthesizer 22, can be respectively represented as:

$$V(t)_{s1} = V_{ts} \sin \delta t$$

$$V(t)_{s2} = V_{ts} \sin 2\delta t$$

$$V(t)_{s3} = V_{ts} \sin 3\delta t$$

$$V(t)_{s4} = V_{ts} \sin 4\delta t$$

where $V_{ts}$ is the amplitude (in voltage) of each of the four transmitter synthesizer signals.

The synthesizer signals are derived from a single reference source internal to the frequency synthesizer 22. Several approaches are available for generating these signals. For instance, the signals, having evenly spaced frequencies, may be generated by a daisy-chain arrangement of voltage controlled oscillators (VCOs). Under this approach, each VCO is locked to a frequency which is the sum of the offset frequency, $\delta$, provided by a reference generator, and the frequency of the previous VCO in the daisy-chain. Alternatively, evenly spaced frequencies can be generated by applying the output of a linearly-swept frequency source to a tapped delay line. The spacing of the taps determines the relative output frequency. It is to be appreciated that other methods known to persons skilled in this art may be employed to derive the synthesizer signals. Further, it is to be understood that the frequency synthesizer 22 may also serve as the source of the original RF signal, which was accordingly modulated prior to being introduced to the power divider 20.

Accordingly, the constituent signals are respectively presented to the first input ports of the single sideband frequency conversion mixers 24–27, while the synthesizer signals are respectively presented to the second input ports of the single sideband frequency conversion mixers 24–27. Responsively, mixers 24–27 heterodyne (i.e., mix) the constituent signals with the synthesizer signals thereby frequency converting the constituent signals. The constituent signals, present on the output ports of the mixers 24–27, can then be respectively represented as:

$$V(t)_{m1}=V_1 \sin (\omega+\delta)t$$

$$V(t)_{m2}=V_2 \sin (\omega+2\delta)t$$

$$V(t)_{m3}=V_3 \sin (\omega+3\delta)t$$

$$V(t)_{m4}=V_4 \sin (\omega+4\delta)t$$

It is to be appreciated that the above heterodyning step provides each constituent signal with its own unique marking.

The constituent signals are next presented to the first input ports of the pseudo-random phase shifters 34–37. Concurrently, time stationary pseudo-random phase code generator 32 generates pseudo-random phase codes (i.e., phase code sequences) which are presented to the second input ports of the pseudo-random phase shifters 34–37 via the output ports of the code generator 32. Thus, the constituent signals are respectively pseudo-randomly phase shifted by the pseudo-random phase shifters 34–37. The constituent signals, present on the output ports of the pseudo-random phase shifters 34–37, can be respectively represented as:

$$V(t)_{ps1}=V_1 \sin [(\omega+\delta)t+\phi_1]$$

$$V(t)_{ps2}=V_2 \sin [(\omega+2\delta)t+\phi_2]$$

$$V(t)_{ps3}=V_3 \sin [(\omega+3\delta)t+\phi_3]$$

$$V(t)_{ps4}=V_4 \sin [(\omega+4\delta)t+\phi_4]$$

where $\phi_1$ through $\phi_4$ represent a time stationary pseudo-random phase shift applied to the respective constituent signals. It is to be understood that the above pseudo-random phase shifting step provides the pseudo-randomization necessary to prevent formation of a real beam when the constituent signals are radiated into free space. Further, it is to be appreciated that this pseudo-random phase shifting step is not required if the frequency synthesizer 22 generates pseudo-randomly spaced frequencies during the heterodyning step. The pseudo-random phase shifting step is also not required if the constituent signals are presented to the transmitting elements 42–45 in pseudo-random order.

Next, the constituent signals are presented to the transmitting elements 42–45, where they are respectively radiated into free space. As previously discussed, an additional phase shift is imparted on each of the constituent signals due to radiation oblique to each of the transmitting elements. Thus, the constituent signals radiated into free space can be further respectively represented as:

$$V(t)_{R1}=V_1 \sin [(\omega+\delta)t+\phi_1+\beta_1]$$

$$V(t)_{R2}=V_2 \sin [(\omega+2\delta)t+\phi_2+\beta_2]$$

$$V(t)_{R3}=V_3 \sin [(\omega+3\delta)t+\phi_3+\beta_3]$$

$$V(t)_{R4}=V_4 \sin [(\omega+4\delta)t+\phi_4+\beta_4]$$

Each of the symbols $\beta_1$–$\beta_4$, which represent the phase shift added to the transmitted signals due to oblique radiation, can be specifically defined as equaling $(2\pi d/\lambda) \sin \theta$, where $\theta$ represents the receiver direction relative to the array normal, d represents the transmitting element spacing from the array center, and $\lambda$ represents the corresponding wavelength associated with the frequency of the constituent signal.

Accordingly, the constituent signals form a transmitted composite signal as they are radiated into free space.

Still referring to FIG. 2, the receiving element 58, of the receiving subsystem 2, receives the transmitted composite signal. The transmitted composite signal is presented to the input port of power divider 60 where it is divided into four transmitted composite signal portions. Concurrently, the frequency synthesizer 62 generates four individual synthesizer signals. The synthesizer signals, present on the output ports of frequency synthesizer 62, can be respectively represented as:

$$V(t)_{s1}=V_{rs} \sin (\omega+\omega_{IF}\delta)t$$

$$V(t)_{s2}=V_{rs} \sin (\omega+\omega_{IF}2\delta)t$$

$$V(t)_{s3}=V_{rs} \sin (\omega+\omega_{IF}3\delta)t$$

$$V(t)_{s4}=V_{rs} \sin (\omega+\omega_{IF}4\delta)t$$

where $\omega_{IF}$ represents a common intermediate frequency and $V_{rs}$ is the amplitude (in voltage) of each of the four receiver synthesizer signals. These synthesizer signals may be derived in a manner similar to that employed to derive the synthesizer signals associated with the transmitting subsystem 1, or by any manner known to one skilled in this art.

Next, the synthesizer signals are respectively presented to the first input ports of the conjugate phase shifters 64–67, while signals corresponding to conjugate phase shifts, generated by conjugate phase code generator 63, are respectively presented to the second input ports of the conjugate phase shifters 64–67 via the output ports of the conjugate phase code generator 63. It is to be understood that each conjugate phase shift is equivalent to the conjugate of the sum of the pseudo-random phase shift and the oblique radiation phase shift imparted at the transmitting subsystem 1. Thus, conjugate phase shifters 64–67 respectively generate four phase shifter signals. The phase shifter signals, present on the output ports of the conjugate phase shifters 64–67, can be respectively represented as:

$$V(t)_{ps1}=V_{rs} \sin [(\omega+\omega_{IF}+\delta)t+\phi_{1+\beta_1}]$$

$$V(t)_{ps2}=V_{rs} \sin [(\omega+\omega_{IF}+2\delta)t+\phi_2+\beta_2]$$

$$V(t)_{ps3}=V_{rs} \sin [(\omega+\omega_{IF}+3\delta)t+\phi_3+\beta_3]$$

$$V(t)_{ps4}=V_{rs} \sin [(\omega+\omega_{IF}+4\delta)t+\phi_4+\beta_4]$$

Accordingly, the phase shifter signals are respectively presented to the first input ports of the mixers 72–75, while the transmitted composite signal portions are respectively presented to the second input ports of the mixers 72–75 via the output ports of the power divider 60. Responsively, the mixers 72–75 heterodyne the transmitted composite signal portions (which are sums of received constituent signals) with the phase shifter signals thereby frequency converting and phase synchronizing the sums of received constituent signals.

For example, at the first mixer 72, the heterodyne process effectively subtracts the frequency and phase terms of each of the four received constituent signals in the composite sum from the frequency and phase terms of the phase shifter signal, $V(t)_{ps1}$ to get the following output:

$$V(t)_{m1} = V_{rs}AV_1 \sin\omega_{IF}t + V_{rs}AV_2\sin[(\omega_{IF} - \delta)t + (\phi_1 + \beta_1) -$$

$$(\phi_2 + \beta_2)] + V_{rs}AV_3\sin[(\omega_{IF} - 2\delta)t + (\phi_1 + \beta_1) - (\phi_3 + \beta_3)] +$$

-continued $$V_{r4}AV_4\sin[(\omega_{IF} - 3\delta)t + (\phi_1 + \beta_1) - (\phi_3 + \beta_3)]$$

where A is an amplitude scaling factor which accounts for amplitude gain/loss as the signals are transmitted from the transmitting subsystem to the receiving subsystem and through to the mixers. Thus, the frequency of the first received constituent signal is converted to $\omega_{IF}$ and its phase shift, $(\phi_1+\beta_1)$, is removed. The frequencies of the second, third and fourth constituent signals are converted to values which are offset from $\omega_{IF}$ by multiples of $\delta$.

Similarly, the heterodyne process at the second, third and fourth mixers 73–75 convert the frequencies of the second, third and fourth received constituent signals respectively to $\omega_{IF}$ and remove their phase shifts. It is to be appreciated that the mixers may be image rejection type mixers which add further capability for rejection of unwanted signal components. The signals present on the output ports of mixers 72–75 are then respectively presented to the input ports of the bandpass filters 80–83. Each of the bandpass filters 80–83 have a center frequency of $\omega_{IF}$. Accordingly, the bandpass filters 80–83 pass only the received constituent signals which are frequency converted to $\omega_{IF}$ and reject those which are converted to values which are offset from $\omega_{IF}$. Thus, the received constituent signals, present on the output ports of the bandpass filters 80–83, can then be respectively represented as:

$$V(t)_{F1}=BV_1 \sin \omega_{IF}t$$
$$V(t)_{F2}=BV_2 \sin \omega_{IF}t$$
$$V(t)_{F3}=BV_3 \sin \omega_{IF}t$$
$$V(t)_{F4}=BV_4 \sin \omega_{IF}t$$

where B is an amplitude scaling factor which accounts for amplitude gain/loss as the signals pass through the mixers and any post-mixer amplification stage. It is to be appreciated that the above heterodyning step removes the unique marking as well as the pseudo-random and oblique radiation phase shifts provided at the transmitting subsystem 1.

Finally, the received constituent signals, exhibiting a common frequency and being cophasal with respect to each other, are presented to the input ports of the power combiner 88 via the output ports of the bandpass filters 80–83. Power combiner 88 combines the voltages associated with the received constituent signals thereby forming a received composite signal. The received composite signal, present on the output port of the power combiner 88, can be represented as:

$$V_{sum} \sin \omega_{IF}t$$

where $V_{sum}$ is equal to the sum of voltages $BV_1$ through $BV_4$. Thus, this final summing step allows the receiving subsystem 2 to realize the processing gain associated with the directive gain of the virtual beam.

It is to be understood that in the case where either the transmitting subsystem 1 or the receiving subsystem 2, or both, are moving relative to each other, it may be necessary to compensate for Doppler frequency shift at the receiving subsystem 2. Also, it is to be appreciated that the phase shift needed to compensate for the oblique radiation is directly computed or may be obtained from a lookup table if the direction of the receiving subsystem relative to the transmit array normal is known at the receiving subsystem. For a case where there is no relative motion between the transmitting subsystem and the receiving subsystem, the values of the phase shift caused by the oblique radiation are not a function of time.

Alternatively, the receiving subsystem can search for the correct value of this direction using an adaptive acquisition process. In one approach, this search is started with an approximate guess of the directional angle and, accordingly, the level of the received signal is noted. Then, the angle is changed in steps while the level of the received signal is correspondingly monitored. The steps are initially sized equal to the half power width of the virtual beam, and later, sized equal to one-quarter of this value. The direction of the step is chosen in accordance with whichever direction yields an increase in the level of the received signal. The search stops when a global maximum level is reached. Such a search will only be successful when conducted by a receiving subsystem formed in accordance with the present invention because the search will only locate the maximum level if the constituent signals are first frequency and phase shifted to remove coding and achieve coherence.

Figure 3:
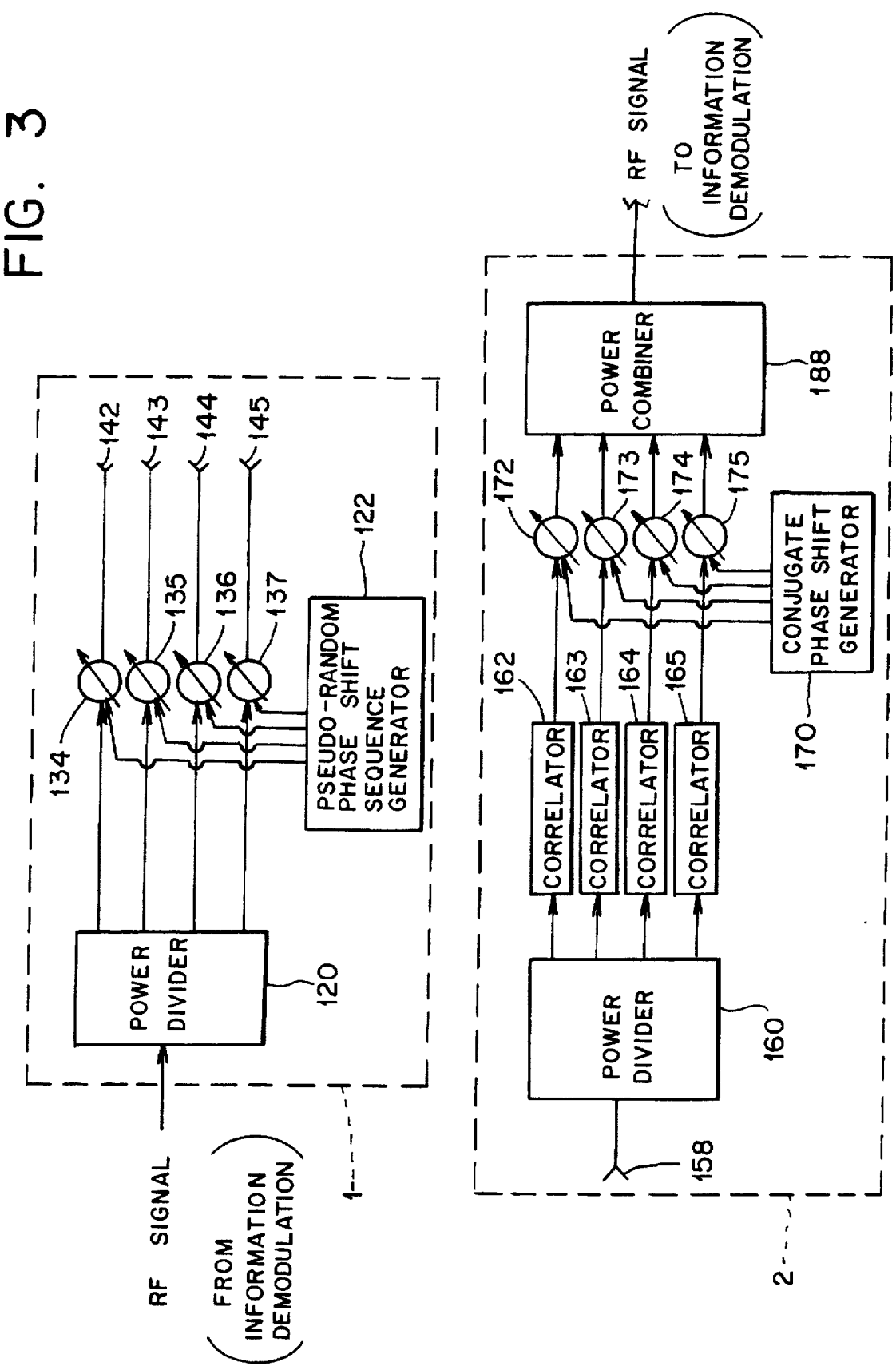
FIG. 3 is a functional block diagram of another embodiment of a virtual beam system formed in accordance with the present invention.

Referring now to FIG. 3, a functional block diagram of another embodiment of the virtual beam system, formed in accordance with the present invention, is illustrated. The virtual beam system, illustrated in FIG. 3, employs a code multiplexing approach, as previously discussed, for element position encoding and element position decoding. Again, it is to be appreciated that the virtual beam system is essentially composed of a transmitting subsystem 1 and a receiving subsystem 2.

Transmitting subsystem 1, illustrated within the dashed lines, includes transmitting elements 142–145. Again, it is to be understood that for the sake of simplicity, this particular embodiment employs only four transmitting elements; however, a virtual beam system formed in accordance with the present invention is not so limited. Transmitting subsystem 1 also includes power divider 120 having an input port and four output ports, pseudo-random phase code sequence generator 122 having four output ports, and pseudo-random phase shifters 134–137, each having a first input port, a second input port and an output port.

Accordingly, the first input ports of the pseudo-random phase shifters 134–137 are respectively coupled to the output ports of the power divider 120, while the second input ports of the pseudo-random these shifters 134–137 are respectively coupled to the output ports of the pseudo-random phase code sequence generator 122. Lastly, the transmitting elements 142–145 are respectively coupled to the output ports of the pseudo-random phase shifters 134–137.

Receiving subsystem 2, illustrated within the dashed lines, includes receiving element 158, power divider 160 having an input port and four output ports, correlators 162–165, each having an input port and an output port, conjugate phase shift generator 170 having four output ports, conjugate phase shifters 172–175, each having a first input port, a second input port and an output port, and power combiner 188 having four input ports and an output port.

Accordingly, the input port of the power divider 160 is coupled to receiving element 158, while the four output ports of the power divider 160 are respectively coupled to the input ports of the correlators 162–165. Further, the first input ports of the conjugate phase shifters 172–175 are respectively coupled to the four output ports of the conjugate phase shift generator 170, while the second input ports of the conjugate phase shifters 172–175 are respectively coupled to the output ports of the correlators 162–165. Lastly, the four input ports of the power combiner 188 are respectively coupled to the output ports of the conjugate phase shifters 172–175.

It is to be appreciated that, with respect to the transmitting subsystem 1, the function of the element position encoding means 6, as discussed in regard to FIG. 1, is performed by the pseudo-random phase code sequence generator 122 and the pseudo-random phase shifters 134–137. Further, with respect to transmitting subsystem 1, the power divider 120 and the transmitting elements 142–145 respectively perform the functions associated with the first dividing means 4 and the transmitting antenna array 8, illustrated in FIG. 1.

Likewise, it is to be appreciated that, with respect to the receiving subsystem, the function of the element position decoding means 14, as discussed in regard to FIG. 1, is performed by the correlators 162–165, the conjugate phase shift generator 170, and the conjugate phase shifters 172–175. Further, with respect to the receiving subsystem 2, the power divider 160, the power combiner 188, and the receiving element 158 respectively perform the functions associated with the second dividing means 12, the combining means 16, and the receiving antenna 10, illustrated in FIG. 1.

Accordingly, the virtual beam system of the present invention, as illustrated in FIG. 3, operates in the following manner. An RF signal is introduced to the transmitting subsystem 1 at the input port of power divider 120. It is to be appreciated that the RF signal may have been modulated, in any manner known to persons skilled in this art, prior to being introduced to the power divider 120. For example, the RF signal may have been modulated by a separate pseudo-random code sequence whereby the RF signal is encoded with the information contained in an information signal. Also, the RF signal may or may not be spread spectrum modulated prior to being introduced to the present invention.

Power divider 120 divides the RF signal and respectively generates four individual constituent signals on each of the power divider's four output ports. Concurrently, pseudo-random phase code sequence generator 122 generates four different pseudo-random phase codes which are present on the generator's respective output ports. Accordingly, each constituent signal is respectively presented to the first input ports of the pseudo-random phase shifters 134–137, while the pseudo-random phase codes are respectively presented to the second input ports of the pseudo-random phase shifters 134–137. Responsively, pseudo-random phase shifters 134–137 respectively encode the constituent signals in response to the pseudo-random phase codes provided by the pseudo-random phase code sequence generator 122. It is to be appreciated that the above encoding step provides each constituent signal with both the unique marking to identify the signal with the particular transmitting element from which it will be radiated, and the pseudo-randomization necessary to prevent formation of a real beam when the constituent signals are radiated into free space.

Further, it is to be appreciated that in the case where the RF signal is to be modulated by a separate pseudo-random phase code sequence and the chip rate associated with that particular information modulation is the same as the chip rate associated with the individual pseudo-random phase codes generated by the pseudo-random phase code sequence generator 122, the information modulation may be respectively added to the pseudo-random phase codes and the resulting sums respectively applied to the second input ports of the pseudo-random phase shifters 134–137. Thus, the pseudo-random phase shifters 134–137 will not only encode the constituent signals, but also modulate the constituent signals as well. This particular embodiment would be in lieu of separately modulating the RF signal prior to the RF signal being divided by the power divider 120.

Next, the constituent signals are presented to the transmitting elements 142–145, via the output ports of the pseudo-random phase shifters 134–137, where they are radiated into free space. As previously discussed, an additional phase shift is imparted on each of the constituent signals due to the radiation oblique to each one of the transmitting elements. Accordingly, the constituent signals form a transmitted composite signal as they are radiated into free space.

Still referring to FIG. 3, the receiving element 158, of the receiving subsystem 2, receives the transmitted composite signal. The transmitted composite signal is presented to the input port of power divider 160 where it is divided into four transmitted composite signal portions. Next, the transmitted composite signal portions are respectively presented to the input ports of the correlators 162–165 via the output ports of the power divider 160. The correlators 162–165 contain, and are thus respectively driven by, pseudo-random phase codes that are complementary to the pseudo-random phase codes generated by the pseudo-random phase code sequence generator 122 of the transmitting subsystem 1.

Each correlator serves to time compress the particular received constituent signal (within the transmitted composite signal portion applied to the correlator's input) which is identified with its phase code into a train of pulses. This arrangement allows each correlator to separate the particular constituent signal identified with its phase code from the transmitted composite signal portion received from the power divider and, at the same time, remove the phases imparted by the phase code. The degree of separation is determined by the cross-correlation between the phase codes which ideally is zero. Thus, the correlators 162–165 respectively decode the received constituent signals. It is to be appreciated that the above correlating step removes the unique marking as well as the pseudo-randomization provided at the transmitting subsystem 1.

Further, as previously discussed, it is to be understood that if the pseudo-random phase shifters 134–137 of the transmitting subsystem 1 had not only encoded, but also modulated, the constituent signals, then the complementary phase codes driving the correlators 162–167 may also contain the information demodulation code. Thus, the correlators 162–165 would not only decode, but also demodulate, the received constituent signals.

Next, the pulse trains corresponding to the received constituent signals, decoded by the correlators, are presented to the second input ports of the conjugate phase shifters 172–175, while signals corresponding to conjugate phase shifts, generated by the conjugate phase shift generator 170, are respectively presented to the first input ports of the conjugate phase shifters 172–175 via the output ports of the conjugate phase shift generator 170. The conjugate phase shifts are equivalent to the oblique radiation phase shifts imparted at the transmitting subsystem 1. Responsively, the conjugate phase shifters 172–175 respectively phase shift the pulse trains corresponding to the received constituent signals thereby removing the oblique radiation phase shift imparted on each constituent signal. Then, the pulse trains, cophasal with respect to one another, are respectively presented to the input ports of the power combiner 188 via the output ports of the conjugate phase shifters 172–175.

Finally, the power combiner 188 combines the voltages associated with the pulse trains thereby forming a received composite signal. Thus, as with the embodiments illustrated in FIG. 1 and FIG. 2, this final summing step allows the receiving subsystem 2 to realize the processing gain associated with the directive gain of the virtual beam.

Referring now to FIG. 4, a functional block diagram of yet another embodiment of a virtual beam system, formed in accordance with the present invention, is illustrated. The virtual beam system, illustrated in FIG. 4, employs a combination of code and time multiplexing approaches for element position encoding and element position decoding. Again, it is to be appreciated that the virtual beam system is essentially composed of a transmitting subsystem 1 and a receiving subsystem 2.

Transmitting subsystem 1, illustrated within the dashed lines, includes transmitting elements 242–245. Again, like the previous embodiments, it is to be understood that for the sake of simplicity, this particular embodiment employs only four transmitting elements; however, a virtual beam system formed in accordance with the present invention is not so limited. Transmitting subsystem 1 also includes power divider 220 having an input port and four output ports (again, more ports if there is a greater number of antenna elements), pseudo-random phase code sequence generator 222 having an output port, shift register 224 having an input port and four output ports, and pseudo-random phase shifters 234–237, each having a first input port, a second input port and an output port.

Accordingly, the first input ports of the pseudo-random phase shifters 234–237 are respectively coupled to the output ports of the power divider 220, while the second input ports of the pseudo-random phase shifters 234–237 are respectively coupled to the output ports of the shift register 224. The input port of the shift register 224 is coupled to the output port of the pseudo-random phase code sequence generator 222. Further, the transmitting elements 242–245 are respectively coupled to the output ports of the pseudo-random phase shifters 234–237.

Receiving subsystem 2, illustrated within the dashed lines, includes receiving element 258, correlator 260 having an input port and an output port, a tapped delay line 262 having an input port and four output ports, conjugate phase shift generator 264 having four output ports, conjugate phase shifters 272–275, each having a first input port, a second input port and an output port and power combiner 288 having four input ports and an output port.

Accordingly, the receiving element 258 is coupled to the input port of correlator 260. The input port of the tapped delay line 262 is coupled to the output port of the correlator 260. The first input ports of the conjugate phase shifters 272–275 are respectively coupled to the output ports of the tapped delay line 262, while the second input ports of the conjugate phase shifters 272–275 are respectively coupled to the output ports of the conjugate phase shift generator 264. Lastly, the input ports of the power combiner 288 are respectively coupled to the output ports of the conjugate phase shifters 272–275.

It is to be appreciated that, with respect to the transmitting subsystem 1, the function of the element position encoding means 6, as discussed in regard to FIG. 1, is performed by the pseudo-random code sequence generator 222, the shift register 224, and the pseudo-random phase shifters 234–237. Further, with respect to the transmitting subsystem 1, the power divider 220 and the transmitting elements 242–245 respectively perform the functions associated with the first dividing means 4 and the transmitting antenna array 8, illustrated in FIG. 1.

Likewise, it is to be appreciated that, with respect to receiving subsystem 2, the function of the element position decoding means 14, as discussed in regard to FIG. 1, is performed by the correlator 260, the tapped delay line 262, the conjugate phase shift generator 264, and the conjugate phase shifters 272–275. Further, with respect to the receiving subsystem 2, the power combiner 288 and the receiving element 258 respectively perform the functions associated with the combining means 16 and the receiving antenna 10, illustrated in FIG. 1.

Accordingly, the virtual beam system of the present invention, illustrated in FIG. 4, operates in the following manner. An RF signal is introduced to the transmitting subsystem 1 at the input port of power divider 220. Similar to the previous embodiments discussed, it is to be appreciated that the RF signal may have been modulated, in any manner known to persons skilled in this art, prior to being introduced to the power divider. For example, the RF signal may have been modulated by a separate pseudo-random code sequence whereby the RF signal is encoded with the information contained in an information signal. Again, the RF signal may or may not be spread spectrum modulated prior to being introduced to the present invention.

Power divider 220 divides the RF signal and respectively generates four individual constituent signals on each of the power divider's four output ports. Concurrently, pseudo-random phase code sequence generator 222 generates a single pseudo-random phase code which is present on the generator's output port. The single serial pseudo-random phase code is presented to the input port of shift register 224. Shift register 224, in response to this code sequence, generates four derivative serial codes which are time-shifted versions of the single pseudo-random phase code supplied by the pseudo-random phase code generator 222. It is to be appreciated that the shift register function may alternately be accomplished by a tapped delay line or any device, known to persons skilled in this art, which can likewise perform this function.

From this point on, the transmitting subsystem 1 operates in a similar manner as the embodiment illustrated in FIG. 3. That is, each constituent signal is respectively presented to the first input ports of the pseudo-random phase shifters 234–237, while the derivative pseudo-random phase codes are respectively presented to the second input ports of the pseudo-random phase shifters 234–237. Responsively, the pseudo-random phase shifters 234–237 respectively encode the constituent signals in response to the derivative pseudo-random phase codes provided by the shift register 224. It is to be appreciated that the above encoding step provides each constituent signal with both the unique marking to identify the signal with the particular transmitting element from which it will be radiated, and the pseudo-randomization necessary to prevent formation of a real beam when the constituent signals are radiated into free space.

Further, it is to be appreciated that the pseudo-random phase shifters 234–237 may modulate, as well as encode, the constituent signals in the same manner as described for the pseudo-random phase shifters of the virtual beam system illustrated in FIG. 3. That is, the information modulation may be added equally to all the derivative pseudo-random phase codes generated by the shift register 224. Again, this particular embodiment would be in lieu of separately modulating the RF signal prior to the RF signal being divided by the power divider 220.

Next, the constituent signals are presented to the transmitting elements 242–245, via the output ports of the pseudo-random phase shifters 234–237, where they are radiated into free space. Similar to previous embodiments, an additional phase shift is imparted on each of the constituent signals due to radiation oblique to each of the transmitting elements. Accordingly, the constituent signals form a transmitted composite signal as they are radiated into free space.

Still referring to FIG. 4, the receiving element 258, of the receiving subsystem 2, receives the transmitted composite signal. The transmitted composite signal is presented to the input port of correlator 260, which removes the pseudo-random phase code generated by the pseudo-random phase code generator 222 and also serves to time compress the four received constituent signals within the transmitted composite signal into a sequence of contiguous pulses. The pulse due to the first constituent signal occurs first, followed by that due to the second constituent signal, and so-on until after the pulse due to the fourth constituent signal. Then the entire sequence repeats as long as the need to communicate continues. The train of pulses at the output of the correlators 260 is presented to the input port of the tapped delay line 262. The tapped delay line 262 serves to remove the time-shift of the pulses associated with each constituent signal and thereby generates four pulses due to the received constituent signals, at its output ports, which are time-synchronized.

Next, these time-synchronized pulses are respectively presented to the first input ports of the conjugate phase shifters 272-275, while signals corresponding to the conjugate phase shifts, generated by conjugate phase shift generator 264, are respectively presented to the second input ports of the conjugate phase shifters 272-275. Each conjugate phase shift removes the phase shift imparted by the oblique radiation at the transmitting subsystem 1. Responsively, the conjugate phase shifters 272-275 phase synchronize the time-synchronized pulses.

It is to be appreciated that the above decoding (time compression by the correlator, time alignment by the tapped delay line and phase alignment by the conjugate phase shifters) step removes the unique marking, the pseudo-randomization, and the oblique radiation phase shift provided at the transmitting subsystem 1. Further, as discussed with respect to the embodiment in FIG. 3, if the pseudo-random phase shifters 234-237 also modulate the constituent signals, then the conjugate phase shifters 272-275 may also demodulate the pulses associated with the received constituent signals.

The pulses associated with the received constituent signals, cophasal with respect to one another, are then respectively presented to the input ports of the power combiner 288 via the output ports of the conjugate phase shifters 272-275. Finally, the power combiner 288 combines the pulses associated with the received constituent signals thereby forming a received composite pulse signal. Thus, as with the embodiments illustrated in FIGS. 1-3, this final summing step allows the receiving subsystem 2 to realize the processing gain associated with the directive gain of the virtual beam.

It is to be appreciated that, while the cross-correlation function of the multiple phase codes of the embodiment of FIG. 3 was the determinant of performance, in comparison, it is the auto-correlation function of the single phase code of this particular embodiment which determines performance. Thus, as is evident, this particular embodiment is designed to forego the added security of multiple phase codes in favor of the advantage of hardware simplification. However, it is to be understood that a virtual beam system, formed in accordance with the present invention, may be designed using alternative code multiplexing embodiments with varying degrees of compromise between security and hardware simplicity. For instance, an alternative embodiment may include a transmitting antenna array which divides its individual transmitting elements into rows and columns, whereby each row is encoded with time-shifted derivatives of its own unique pseudo-random phase code. In fact, it is to be appreciated that a virtual beam system, formed in accordance with the present invention, may employ any similar code multiplexing arrangement and still provide the unique advantages that exist over prior art communication systems.

As is evident from the foregoing description, the virtual beam system of the present invention provides substantially improved LPI techniques and thus achieves two of the major goals of communication system design, i.e., privacy and elimination of interference in a multiple-user environment. The present invention provides such advantageous features by uniquely marking and pseudo-randomizing each constituent signal radiated at the transmitting subsystem and then, in turn, separating and phase shifting the received constituent signals at the receiving subsystem, thus allowing coherent addition which in turn provides processing gain. This gain allows reduction of transmitter power, thus ensuring a low probability that the information contained in the constituent signals will be intercepted by an unintended source. Thus, one of the most advantageous results associated with the present invention is essentially a transmission which is spread out over a wide angular sector with low directive gain to non-compatible receivers, which, surprisingly, also appears as a narrow beam with high directive gain to a receiving subsystem formed in accordance with the present invention.

It is also to be appreciated that a virtual beam system formed in accordance with the present invention may be employed in radar applications. For instance, whether in a monostatic (i.e., transmitting and receiving subsystems co-located) or bistatic (i.e., transmitting and receiving subsystems not co-located) configuration, a radar system designed in accordance with the present invention will significantly reduce the probability that the radar system's radiated beam will be intercepted, decoded to obtain the beam parameters, and effectively jammed by non-friendly sources engaging in electronic counter-measures.

It is also to be appreciated that the virtual beam system formed in accordance with the present invention may also include other system components which may serve to improve system operation even more. For example, amplifiers may be added to prevent signal-to-noise ratio degradation which would otherwise be caused by power division or phase shifter dissipation.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A virtual beam system for achieving a relatively high processing gain by forming a narrow virtual transmit beam, the system being responsive to a signal introduced thereto, the system comprising:

at least one transmitting subsystem, the at least one transmitting subsystem including:
a transmitting antenna array including a plurality of transmitting elements, each one of the plurality of transmitting elements having a position spaced apart from each other;
first dividing means, the first dividing means being responsive to the signal and generating a plurality of constituent signals including one constituent signal for each one of the plurality of transmitting elements;
means for element position encoding, the encoding means being responsive to the plurality of constituent signals, the encoding means including:

means for uniquely marking each one of the plurality of constituent signals, the marking means providing each one of the plurality of constituent signals with a unique marking, the unique marking representing the position of each one of the plurality of transmitting elements in the antenna array; and means for pseudo-randomly phase shifting each one of the plurality of constituent signals, the phase shifting means imparting a pseudo-random phase shift on each one of the plurality of constituent signals, the pseudo-random phase shift associated with each one of the plurality of constituent signals substantially reducing a probability that the plurality of constituent signals will be intercepted upon transmission;

the transmitting antenna array being responsive to the plurality of constituent signals, each one of the plurality of transmitting elements respectively radiating one of the plurality of constituent signals;

radiation oblique to the plurality of transmitting elements imparting an additional phase shift on each one of the plurality of constituent signals, the plurality of constituent signals, further phase shifted by the oblique radiation, forming a transmitted composite signal; and at least one receiving subsystem, the at least one receiving subsystem including:

at least one receiving element, the at least one receiving element being responsive to the transmitted composite signal radiated by the transmitting antenna array;

second dividing means, the second dividing means being responsive to the transmitted composite signal received by the at least one receiving element, the second dividing means dividing the transmitted composite signal received by the at least one receiving element into a plurality of transmitted composite signal portions;

means for element position decoding, the decoding means being responsive to the plurality of transmitted composite signal portions, the decoding means including:

separation means, the separation means separating a plurality of received constituent signals from the plurality of transmitted composite signal portions;

first removing means, the first removing means removing the unique marking provided by the marking means from the plurality of received constituent signals;

second removing means, the second removing means removing the pseudo-random phase shift imparted by the phase shifting means from the plurality of received constituent signals;

third removing means, the third removing means removing the phase shift imparted by the radiation oblique to each one of the plurality of transmitting elements from the plurality of received constituent signals; and means for coherently combining the plurality of received constituent signals to effectively form the narrow virtual transmit beam thereby allowing the at least one receiving subsystem to realize the relatively high processing gain.

2. A virtual beam system as defined in claim 1, wherein the signal is a product of spread spectrum modulation.

3. A virtual beam system as defined in claim 1, wherein the marking means includes means for frequency synthesizing, the frequency synthesizing means respectively converting a frequency associated with the signal introduced to the at least one transmitting subsystem to a plurality of different frequencies, each one of the plurality of different frequencies being respectively associated with one of the plurality of constituent signals, the plurality of different frequencies being evenly spaced.

4. A virtual beam system as defined in claim 1, wherein the element position encoding means includes means for frequency synthesizing, the frequency synthesizing means respectively converting a frequency associated with the signal introduced to the at least one transmitting subsystem to a plurality of different frequencies, each one of the plurality of different frequencies being respectively associated with one of the plurality of constituent signals, the plurality of different frequencies being pseudo-randomly spaced.

5. A virtual beam system as defined in claim 1, wherein the element position encoding means includes means for time offsetting, the time offsetting means causing each one of the plurality of constituent signals to be respectively radiated by one of the plurality of transmitting elements at a plurality of different times, the plurality of different times being pseudo-randomly spaced.

6. A virtual beam system as defined in claim 1, wherein the element position encoding means includes means for encoding each one of the plurality of constituent signals with a different pseudo-random phase code sequence, the encoding means providing each one of the plurality of constituent signals with the unique marking and the pseudo-random phase shift.

7. A virtual beam system as defined in claim 1, wherein the pseudo-random phase shift associated with the phase shifting means is provided by a time stationary pseudo-random phase code.

8. A virtual beam system as defined in claim 1, wherein the pseudo-random phase shift associated with the phase shifting means is provided by a time varying pseudo-random phase code.

9. A virtual beam system for achieving a relatively high processing gain by forming a narrow virtual transmit beam, the system being responsive to a signal introduced thereto, the system comprising:

at least one transmitting subsystem, the at least one transmitting subsystem including:

a transmitting antenna array including a plurality of transmitting elements, each one of the plurality of transmitting elements having a position spaced apart from each other;

a first power divider, the first power divider being responsive to the signal and dividing the signal into a plurality of constituent signals including one constituent signal for each one of the plurality of transmitting elements;

a transmitter RF processor circuit, the transmitter RF processor circuit being responsive to the plurality of constituent signals and synthesizing a plurality of different synthesized frequencies, each one of the plurality of different synthesized frequencies being respectively associated with one of the plurality of constituent signals, the plurality of different synthesized frequencies being evenly spaced thereby being offset from each other by a common difference frequency, the transmitter RF processor circuit thereby generating a plurality of synthesized constituent signals;

a plurality of pseudo-random phase shifters, the plurality of pseudo-random phase shifters being responsive to the plurality of synthesized constituent signals and imparting a pseudo-random phase shift on each one of the plurality of synthesized constituent signals, the plurality of pseudo-random phase shifters thereby generating a plurality of pseudo-randomized constituent signals;

the transmitting antenna array being responsive to the plurality of pseudo-randomized constituent signals, each one of the plurality of transmitting elements respectively radiating one of the plurality of pseudo-randomized constituent signals;

radiation oblique to the plurality of transmitting elements imparting an additional phase shift on each one of the plurality of pseudo-randomized constituent signals, the plurality of pseudo-randomized constituent signals, further phase shifted by the oblique radiation, forming a transmitted composite signal; and at least one receiving subsystem, the at least one receiving subsystem including:

at least one receiving element, the at least one receiving element being responsive to the transmitted composite signal radiated by the at least one transmitting subsystem;

a second power divider, the second power divider being responsive to the transmitted composite signal received by the at least one receiving element and dividing the transmitted composite signal received by the at least one receiving element into a plurality of transmitted composite signal portions;

a receiver RF processor circuit, the receiver RF processor circuit being responsive to the plurality of transmitted composite signal portions, the receiver RF processor circuit separating a plurality of received constituent signals from the plurality of transmitted composite signal portions, the receiver RF processor circuit realigning the plurality of received constituent signals by converting the plurality of different synthesized frequencies associated with the plurality of received constituent signals to a common frequency and removing the pseudo-random phase shift and the oblique radiation phase shift imparted by the at least one transmitting subsystem, the receiver RF processor circuit thereby generating a plurality of realigned received constituent signals; and a power combiner, the power combiner being responsive to the plurality of realigned received constituent signals, the power combiner coherently combining the plurality of realigned received constituent signals and thereby generating a received composite signal, the received composite signal effectively forming the narrow virtual transmit beam and thereby allowing the at least one receiving subsystem to realize the relatively high processing gain.

10. A virtual beam system as defined in claim 9, wherein the transmitter RF processor circuit includes:

a frequency synthesizer, the frequency synthesizer generating a plurality of synthesizer signals, the plurality of synthesizer signals exhibiting a plurality of different synthesizer frequencies, the plurality of different synthesizer frequencies being evenly spaced thereby being offset from each other by a common difference frequency, each one of the plurality of synthesizer signals respectively exhibiting one of the plurality of different synthesizer frequencies; and a plurality of mixers, the plurality of mixers being responsive to the plurality of synthesizer signals and the plurality of constituent signals, the plurality of mixers mixing the plurality of synthesizer signals with the plurality of constituent signals and thereby generating the plurality of synthesized constituent signals.

11. A virtual beam system as defined in claim 9, wherein the receiver RF processor circuit includes:

a frequency synthesizer, the frequency synthesizer generating a plurality of synthesizer signals, the plurality of synthesizer signals exhibiting a plurality of different synthesizer frequencies corresponding to the plurality of different synthesized frequencies generated at the at least one transmitting subsystem, each one of the plurality of synthesizer signals respectively exhibiting one of the plurality of different synthesizer frequencies;

a plurality of conjugate phase shifters, the plurality of conjugate phase shifters being responsive to the plurality of synthesizer signals and respectively imparting a conjugate phase shift on each one of the plurality of synthesizer signals, the conjugate phase shift being substantially equivalent to a conjugate of a sum of the pseudo-random phase shift and the oblique radiation phase shift imparted by the at least one transmitting subsystem, the plurality of conjugate phase shifters thereby generating a plurality of phase shifted signals;

a plurality of mixers, the plurality of mixers being responsive to the plurality of phase shifted signals and the plurality of transmitted composite signal portions, the plurality of mixers mixing the plurality of phase shifted signals with the plurality of transmitted composite signal portions and thereby generating a plurality of mixed transmitted composite signal portions which are aligned in frequency and phase; and a plurality of bandpass filters, the plurality of bandpass filters having a common bandpass frequency, the plurality of bandpass filters being responsive to the plurality of mixed transmitted composite signal portions, the plurality of bandpass filters passing a plurality of realigned received constituent signals, each one of the plurality of realigned received constituent signals being contained in each one of the plurality of mixed transmitted composite signal portions and, after respectively passing through the plurality of bandpass filters, each one of the plurality of realigned received constituent signals exhibiting the common bandpass frequency.

12. A virtual beam system for achieving a relatively high processing gain by forming a narrow virtual transmit beam, the system being responsive to a signal introduced thereto, the system comprising:

at least one transmitting subsystem, the at least one transmitting subsystem including:

a transmitting antenna array including a plurality of transmitting elements, each one of the plurality of transmitting elements having a position spaced apart from each other;

a first power divider, the first power divider being responsive to the signal and dividing the signal into a plurality of constituent signals including one constituent signal for each one of the plurality of transmitting elements;

a transmitter RF processor circuit, the transmitter RF processor circuit being responsive to the plurality of constituent signals and synthesizing a plurality of different synthesized frequencies, each one of the plurality of different synthesized frequencies being respectively associated with one of the plurality of constituent signals, the plurality of different synthesized frequencies being offset from each other by a pseudo-randomly spaced multiple of a common difference frequency, the transmitter RF processor circuit thereby generating a plurality of pseudo-randomly synthesized constituent signals;

the transmitting antenna array being responsive to the plurality of pseudo-randomly synthesized constituent signals, each one of the plurality of transmitting elements respectively radiating one of the plurality of pseudo-randomly synthesized constituent signals;

radiation oblique to the plurality of transmitting elements imparting a phase shift on each one of the plurality of pseudo-randomly synthesized constituent signals, the plurality of pseudo-randomly synthesized constituent signals, further phase shifted by the oblique radiation, forming a transmitted composite signal; and at least one receiving subsystem, the at least one receiving subsystem including:

at least one receiving element, the at least one receiving element being responsive to the transmitted composite signal radiated by the at least one transmitting subsystem;

a second power divider, the second power divider being responsive to the transmitted composite signal received by the at least one receiving element and dividing the transmitted composite signal received by the at least one receiving element into a plurality of transmitted composite signal portions;

a receiver RF processor circuit, the receiver RF processor circuit being responsive to the plurality of transmitted composite signal portions, the receiver RF processor circuit separating a plurality of received constituent signals from the plurality of transmitted composite signal portions, the receiver RF processor circuit realigning the plurality of received constituent signals by converting the plurality of different transmitting frequencies associated with the plurality of received constituent signals to a common frequency and removing the oblique radiation phase shift imparted by the at least one transmitting subsystem, the receiver RF processor circuit thereby generating a plurality of realigned received constituent signals; and a power combiner, the power combiner being responsive to the plurality of realigned received constituent signals, the power combiner coherently combining the plurality of realigned received constituent signals and thereby generating a received composite signal, the received composite signal effectively forming the narrow virtual transmit beam and thereby allowing the at least one receiving subsystem to realize the relatively high processing gain.

13. A virtual beam system as defined in claim 12, wherein the transmitter RF processor circuit includes:

a frequency synthesizer, the frequency synthesizer generating a plurality of synthesizer signals, the plurality of synthesizer signals exhibiting a plurality of different synthesizer frequencies, the plurality of different synthesizer frequencies being offset from each other by a pseudo-randomly spaced multiple of a common difference frequency, each one of the plurality of synthesizer signals respectively exhibiting one of the plurality of different synthesizer frequencies; and a plurality of mixers, the plurality of mixers being responsive to the plurality of synthesizer signals and the plurality of constituent signals, the plurality of mixers mixing the plurality of synthesizer signals with the plurality of constituent signals and thereby generating the plurality of synthesized constituent signals.

14. A virtual beam system as defined in claim 12, wherein the receiver RF processor circuit includes:

a frequency synthesizer, the frequency synthesizer generating a plurality of synthesizer signals, the plurality of synthesizer signals exhibiting a plurality of different synthesizer frequencies corresponding to the plurality of different synthesized frequencies generated at the at least one transmitting subsystem, each one of the plurality of synthesizer signals respectively exhibiting one of the plurality of different synthesizer frequencies;

a plurality of conjugate phase shifters, the plurality of conjugate phase shifters being responsive to the plurality of synthesizer signals and respectively imparting a conjugate phase shift on each one of the plurality of synthesizer signals, the conjugate phase shift being substantially equivalent to the oblique radiation phase shift imparted by the at least one transmitting subsystem, the plurality of conjugate phase shifters thereby generating a plurality of phase shifted signals;

a plurality of mixers, the plurality of mixers being responsive to the plurality of phase shifted signals and the plurality of transmitted composite signal portions, the plurality of mixers mixing the plurality of phase shifted signals with the plurality of transmitted composite signal portions and thereby generating a plurality of mixed transmitted composite signal portions which are aligned in frequency and phase; and a plurality of bandpass filters, the plurality of bandpass filters having a common bandpass frequency, the plurality of bandpass filters being responsive to the plurality of mixed transmitted composite signal portions, the plurality of bandpass filters passing a plurality of realigned received constituent signals, each one of the plurality of realigned received constituent signals being contained in each one of the plurality of mixed transmitted composite signal portions and, after respectively passing through the plurality of bandpass filters, each one of the plurality of realigned received constituent signals exhibiting the common bandpass frequency.

15. A virtual beam system for achieving a relatively high processing gain by forming a narrow virtual transmit beam, the system being responsive to an information signal introduced thereto, the system comprising:

at least one transmitting subsystem, the at least one transmitting subsystem including:

a transmitting antenna array including a plurality of transmitting elements, each one of the plurality of transmitting elements having a position spaced apart from each other;

a first power divider, the first power divider being responsive to the information signal and dividing the information signal into a plurality of constituent signals including one constituent signal for each one of the plurality of transmitting elements;

a plurality of pseudo-random phase shifters, the plurality of pseudo-random phase shifters being responsive to the plurality of constituent signals, the plurality of pseudo-random phase shifters being respectively driven by a first plurality of different pseudo-random phase code sequences, the plurality of pseudo-random phase shifters respectively encoding and modulating each one of the plurality of constituent signals, the plurality of pseudo-random phase shifters thereby generating a plurality of pseudo-randomized constituent signals;

the transmitting antenna array being responsive to the plurality of pseudo-randomized constituent signals, each one of the plurality of transmitting elements respectively radiating one of the plurality of pseudo-randomized constituent signals;

radiation oblique to the plurality of transmitting elements imparting an additional phase shift on the plurality of pseudo-randomized constituent signals, the plurality of pseudo-randomized constituent signals, further phase shifted by the oblique radiation, forming a transmitted composite signal; and at least one receiving subsystem, the at least one receiving subsystem including:

at least one receiving element, the at least one receiving element being responsive to the transmitted composite signal radiated by the at least one transmitting subsystem;

a second power divider, the second power divider being responsive to the transmitted composite signal received by the at least one receiving element and dividing the transmitted composite signal received by the at least one receiving element into a plurality of transmitted composite signal portions;

a plurality of correlators, the plurality of correlators being responsive to the plurality of transmitted composite signal portions; the plurality of correlators being respectively driven by a second plurality of different pseudo-random phase code sequences, the second plurality of pseudo-random phase code sequences being complementary to the first plurality of pseudo-random phase code sequences of the at least one transmitting subsystem, the plurality of correlators respectively separating, decoding and demodulating a plurality of received constituent signals, each one of the plurality of received constituent signals being contained in each one of the plurality of transmitted composite signal portions, the plurality of correlators thereby generating a plurality of decoded constituent signals;

a plurality of conjugate phase shifters, the plurality of conjugate phase shifters being responsive to the plurality of decoded constituent signals, the plurality of conjugate phase shifters removing the oblique radiation phase shift imparted by the at least one transmitting subsystem and thereby generating a plurality of cophasal constituent signals; and a power combiner, the power combiner being responsive to the plurality of cophasal constituent signals, the power combiner coherently combining the plurality of cophasal constituent signals and thereby generating a received composite signal, the received composite signal forming the narrow virtual transmit beam and thereby allowing the at least one receiving subsystem to realize the relatively high processing gain.

16. A virtual beam system for achieving a relatively high processing gain by forming a narrow virtual transmit beam, the system being responsive to a modulated signal introduced thereto, the system comprising:

at least one transmitting subsystem, the at least one transmitting subsystem including:

a transmitting antenna array including a plurality of transmitting elements, each one of the plurality of transmitting elements having a position spaced apart from each other;

a first power divider, the first power divider being responsive to the modulated signal and dividing the modulated signal into a plurality of constituent signals including one constituent signal for each one of the plurality of transmitting elements;

a plurality of pseudo-random phase shifters, the plurality of pseudo-random phase shifters being responsive to the plurality of constituent signals, the plurality of pseudo-random phase shifters being respectively driven by a first plurality of different pseudo-random phase code sequences, the plurality of pseudo-random phase shifters respectively encoding each one of the plurality of constituent signals, the plurality of pseudo-random phase shifters thereby generating a plurality of pseudo-randomized constituent signals;

the transmitting antenna array being responsive to the plurality of pseudo-randomized constituent signals, each one of the plurality of transmitting elements respectively radiating one of the plurality of pseudo-randomized constituent signals;

radiation oblique to the plurality of transmitting elements imparting an additional phase shift on the plurality of pseudo-randomized constituent signals, the plurality of pseudo-randomized constituent signals, further phase shifted by the oblique radiation, forming a transmitted composite signal; and at least one receiving subsystem, the at least one receiving subsystem including:

at least one receiving element, the at least one receiving element being responsive to the transmitted composite signal radiated by the at least one transmitting subsystem;

a second power divider, the second power divider being responsive to the transmitted composite signal received by the at least one receiving element and dividing the transmitted composite signal received by the at least one receiving element into a plurality of transmitted composite signal portions;

a plurality of correlators, the plurality of correlators being responsive to the plurality of transmitted composite signal portions, the plurality of correlators being respectively driven by a second plurality of different pseudo-random phase code sequences, the second plurality of pseudo-random phase code sequences being complementary to the first plurality of pseudo-random phase code sequences of the at least one transmitting subsystem, the plurality of correlators respectively separating and decoding a plurality of received constituent signals, each one of the plurality of received constituent signals being contained in each one of the plurality of transmitted composite signal portions, the plurality of correlators thereby generating a plurality of decoded constituent signals;

a plurality of conjugate phase shifters, the plurality of conjugate phase shifters being responsive to the plurality of decoded constituent signals, the plurality of conjugate phase shifters removing the oblique radiation shift imparted by the at least one transmitting subsystem and thereby generating a plurality of cophasal constituent signals; and a power combiner, the power combiner being responsive to the plurality of cophasal constituent signals, the power combiner coherently combining the plurality of cophasal constituent signals and thereby generating a received composite signal, the received composite signal forming the narrow virtual transmit beam and thereby allowing the at least one receiving subsystem to realize the relatively high processing gain.

17. A virtual beam system for achieving a relatively high processing gain by forming a narrow virtual transmit beam, the system being responsive to an information signal introduced thereto, the system comprising:

at least one transmitting subsystem, the at least one transmitting subsystem including:

a transmitting antenna array including a plurality of transmitting elements, each one of the plurality of transmitting elements having a position spaced apart from each other;

a first power divider, the first power divider being responsive to the information signal and dividing the information signal into a plurality of constituent signals including one constituent signal for each one of the plurality of transmitting elements;

a plurality of pseudo-random phase shifters, the plurality of pseudo-random phase shifters being responsive to the plurality of constituent signals, the plurality of pseudo-random phase shifters being respectively driven by a first plurality of different pseudo-random phase code sequences, each one of the first plurality of different pseudo-random phase code sequences being a derivative of a common pseudo-random phase code, the plurality of pseudo-random phase shifters respectively encoding and modulating each one of the plurality of constituent signals, the plurality of pseudo-random phase shifters thereby generating a plurality of pseudo-randomized constituent signals;

the transmitting antenna array being responsive to the plurality of pseudo-randomized constituent signals, each one of the plurality of transmitting elements respectively radiating one of the plurality of pseudo-randomized constituent signals;

radiation oblique to the plurality of transmitting elements imparting an additional phase shift on the plurality of pseudo-randomized constituent signals, the plurality of pseudo-randomized constituent signals, further phase shifted by the oblique radiation, forming a transmitted composite signal; and at least one receiving subsystem, the at least one receiving subsystem including:

at least one receiving element, the at least one receiving element being responsive to the transmitted composite signal radiated by the at least one transmitting subsystem;

a correlator, the correlator being responsive to the transmitted composite signal received by the at least one receiving element, the correlator removing the common pseudo-random phase code applied at the at least one transmitting subsystem and time compressing a plurality of received constituent signals within the transmitted composite signal into a sequence of contiguous pulses;

a tapped delay line, the tapped delay line being responsive to the sequence of contiguous pulses and time-synchronizing the sequence thereby generating a plurality of time-synchronized pulses;

a plurality of conjugate phase shifters, the plurality of conjugate phase shifters being responsive to the plurality of time-synchronized pulses, the plurality of conjugate phase shifters demodulating the pulses and removing the additional phase shift imparted by the oblique radiation of the at least one transmitting subsystem thereby generating a plurality of time, phase-synchronized pulses; and a power combiner, the power combiner being responsive to the plurality of time, phase-synchronized pulses and combining the pulses thereby generating a received composite pulse signal, the received composite pulse signal forming the narrow virtual transmit beam and thereby allowing the at least one receiving subsystem to realize the relatively high processing gain.

18. A virtual beam system for achieving a relatively high processing gain by forming a narrow virtual transmit beam, the system being responsive to a modulated signal introduced thereto, the system comprising:

at least one transmitting subsystem, the at least one transmitting subsystem including:

a transmitting antenna array including a plurality of transmitting elements, each one of the plurality of transmitting elements having a position spaced apart from each other;

a first power divider, the first power divider being responsive to the modulated signal and dividing the modulated signal into a plurality of constituent signals including one constituent signal for each one of the plurality of transmitting elements;

a plurality of pseudo-random phase shifters, the plurality of pseudo-random phase shifters being responsive to the plurality of constituent signals, the plurality of pseudo-random phase shifters being respectively driven by a first plurality of different pseudo-random phase code sequences, each one of the first plurality of different pseudo-random phase code sequences being a derivative of a common pseudo-random phase code, the plurality of pseudo-random phase shifters respectively encoding each one of the plurality of constituent signals, the plurality of pseudo-random phase shifters thereby generating a plurality of pseudo-randomized constituent signals;

the transmitting antenna array being responsive to the plurality of pseudo-randomized constituent signals, each one of the plurality of transmitting elements respectively radiating one of the plurality of pseudo-randomized constituent signals;

radiation oblique to the plurality of transmitting elements imparting an additional phase shift on the plurality of pseudo-randomized constituent signals, the plurality of pseudo-randomized constituent signals, further phase shifted by the oblique radiation, forming a transmitted composite signal; and at least one receiving subsystem, the at least one receiving subsystem including:

at least one receiving element, the at least one receiving element being responsive to the transmitted composite signal radiated by the at least one transmitting subsystem;

a correlator, the correlator being responsive to the transmitted composite signal received by the at least one receiving element, the correlator removing the common pseudo-random phase code applied at the at least one transmitting subsystem and time compressing a plurality of received constituent signals within the transmitted composite signal into a sequence of contiguous pulses;

a tapped delay line, the tapped delay line being responsive to the sequence of contiguous pulses and time-synchronizing the sequence thereby generating a plurality of time-synchronized pulses;

a plurality of conjugate phase shifters, the plurality of conjugate phase shifters being responsive to the plurality of time-synchronized pulses, the plurality of conjugate phase shifters removing the additional phase shift imparted by the oblique radiation of the at least one transmitting subsystem thereby generating a plurality of time, phase-synchronized pulses; and a power combiner, the power combiner being responsive to the plurality of time, phase-synchronized pulses and combining the pulses thereby generating a received composite pulse signal, the received composite pulse signal forming the narrow virtual transmit beam and thereby allowing the at least one receiving subsystem to realize the relatively high processing gain.

19. A method for achieving a relatively high processing gain from a narrow virtual transmit beam associated with a virtual beam system, the system including at least one transmitting subsystem and at least one receiving subsystem, the method comprising the steps of:

at the at least one transmitting subsystem:
dividing a signal into a plurality of constituent signals, the plurality of constituent signals quantitatively corresponding to a plurality of transmitting elements associated with the at least one transmitting subsystem;
element position encoding the plurality of constituent signals, the encoding step including the steps of:
uniquely marking each one of the plurality of constituent signals, the marking step providing each one of the plurality of constituent signals with a unique marking, the unique marking representing a position of each one of the plurality of transmitting elements in the at least one transmitting subsystem; and
pseudo-randomly phase shifting each one of the plurality of constituent signals, the pseudo-random phase shifting step imparting a pseudo-random phase shift on each one of the plurality of constituent signals, the pseudo-random phase shift associated with the plurality of constituent signals substantially reducing a probability that the plurality of constituent signals will be intercepted upon transmission;
radiating each one of the plurality of constituent signals, respectively, from corresponding transmitting elements of the plurality of transmitting elements, whereby an additional phase shift is imparted on each one of the plurality of constituent signals due to radiation oblique to the plurality of transmitting elements, the plurality of constituent signals, further phase shifted by the oblique radiation, forming a transmitted composite signal;
at the at least one receiving subsystem:
receiving the transmitted composite signal;
dividing the received transmitted composite signal into a plurality of transmitted composite signal portions, the plurality of transmitted composite signal portions quantitatively corresponding to the plurality of constituent signals;
element position decoding the plurality of transmitted composite signal portions the decoding step including the steps of:
separating a plurality of received constituent signals from the plurality of transmitted composite signal portions;
removing the unique marking, provided during the unique marking step, associated with the plurality of received constituent signals;
removing the pseudo-random phase shift, imparted during the pseudo-random phase shifting step, associated with the plurality of received constituent signals;
removing the phase shift, imparted during the radiating step by the oblique radiation, associated with the plurality of received constituent signals; and
combining the plurality of received constituent signals, coherently, to effectively form the narrow virtual transmit beam thereby allowing the at least one receiving subsystem to realize the relatively high processing gain.

20. A method as defined in claim 19, further comprising the step of spread spectrum modulating the signal prior to the dividing step.

21. A method as defined in claim 19, wherein the unique marking step includes converting a frequency associated with the signal introduced to the at least one transmitting subsystem to a plurality of different frequencies, each one of the plurality of different frequencies being respectively associated with one of the plurality of constituent signals, the plurality of different frequencies being evenly spaced.

22. A method as defined in claim 19, wherein the element position encoding step includes converting a frequency associated with the signal introduced to the at least one transmitting subsystem to a plurality of different frequencies, each one of the plurality of different frequencies being respectively associated with one of the plurality of constituent signals, the plurality of different frequencies being pseudo-randomly spaced.

23. A method as defined in claim 19, wherein the element position encoding step includes time offsetting the plurality of constituent signals, the time offsetting step causing each one of the plurality of constituent signals to be respectively radiated by one of the plurality of transmitting elements at a plurality of different times, the plurality of different times being pseudo-randomly spaced.

24. A method as defined in claim 19, wherein the element position encoding step includes encoding each one of the plurality of constituent signals with a different pseudo-random phase code sequence, the encoding step providing each one of the plurality of constituent signals with the unique marking and the pseudo-random phase shift.

25. A method as defined in claim 19, wherein the pseudo-random phase shift associated with the pseudo-random phase shifting step is provided by a time stationary pseudo-random phase code.

26. A method as defined in claim 19, wherein the pseudo-random phase shift associated with the pseudo-random phase shifting step is provided by a time varying pseudo-random phase code.

* * * * *